(12) United States Patent
Bradley et al.

(10) Patent No.: US 11,710,169 B2
(45) Date of Patent: Jul. 25, 2023

(54) SYSTEMS AND METHODS FOR AUTOMATICALLY RECOMMENDING AN ITEM TO A CUSTOMER WHILE SHOPPING AT A RETAIL STORE

(71) Applicant: Walmart Apollo, LLC, Bentonville, AR (US)

(72) Inventors: David G. Bradley, Bentonville, AR (US); Ashok Ramaraj, Frisco, TX (US); David M. Nelms, Rogers, AR (US); Naveen Veloorkumara, Irving, TX (US); Yogananda Domlur Seetharama, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/061,180

(22) Filed: Oct. 1, 2020

(65) Prior Publication Data

US 2021/0118037 A1     Apr. 22, 2021

Related U.S. Application Data

(60) Provisional application No. 63/008,312, filed on Apr. 10, 2020, provisional application No. 62/916,038, filed on Oct. 16, 2019.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0625* (2013.01); *G06Q 30/0639* (2013.01)

(58) Field of Classification Search
CPC . G06Q 30/0601–0645; G06Q 30/0625; G06Q 30/0631; G06Q 30/0639; G06K 9/6215
See application file for complete search history.

(56) References Cited

U.S. PATENT DOCUMENTS

| 6,386,450 B1 | 5/2002 | Ogasawara |
| 7,113,917 B2 | 9/2006 | Jacobi |

(Continued)

FOREIGN PATENT DOCUMENTS

WO    WO-2020046906 A1 *  3/2020   ............. G06Q 20/12

OTHER PUBLICATIONS

Redman, Russell. "Second Amazon Go Store Opens its Doors." Nation's Restaurant News (2018)ProQuest. Web. Sep. 14, 2021. (Year: 2018).*

(Continued)

*Primary Examiner* — Michael Misiaszek
*Assistant Examiner* — Kennedy Gibson-Wynn
(74) *Attorney, Agent, or Firm* — Fitch, Even, Tabin & Flannery LLP

(57) ABSTRACT

In some embodiments, apparatuses and methods are provided herein useful to automatically recommending an item. In some embodiments, there is provided a system for automatically recommending an item to a customer comprising a plurality of items available for purchase; a portable electronic device configured to obtain identifying data corresponding to a first item collected by a user; and a control circuit configured to receive data associated with the first item; determine a location in the retail store of the first item; identify one or more items previously purchased by the user that are located within a threshold proximity to the location; determine a most frequently bought item of the identified one or more items; and cause a portable electronic device to display a suggestion for the user to collect the most frequently bought item and add the most frequently bought item to an electronic shopping list of items to purchase.

26 Claims, 12 Drawing Sheets

(56) References Cited

U.S. PATENT DOCUMENTS

| | | | |
|---|---|---|---|
| 9,600,840 B1* | 3/2017 | Pope | G06Q 30/0631 |
| 9,799,065 B1* | 10/2017 | Dorner | G06Q 30/0631 |
| 11,004,135 B1* | 5/2021 | Sandler | G06Q 30/0631 |
| 11,062,371 B1* | 7/2021 | Yin | G06Q 30/0641 |
| 2006/0259372 A1* | 11/2006 | Perrier | G06Q 30/00 235/472.02 |
| 2011/0145093 A1* | 6/2011 | Paradise | G06Q 30/02 705/26.1 |
| 2013/0290234 A1* | 10/2013 | Harris | G06Q 30/0631 705/26.7 |
| 2014/0365334 A1* | 12/2014 | Hurewitz | G06Q 30/0613 705/26.41 |
| 2015/0112826 A1 | 4/2015 | Crutchfield, Jr. | |
| 2015/0332372 A1* | 11/2015 | Hariri | G06Q 30/0631 |
| 2016/0321623 A1* | 11/2016 | Chandrasekaran | G06Q 20/20 |
| 2017/0330274 A1* | 11/2017 | Conant, II | G06F 16/9537 |
| 2017/0364889 A1 | 12/2017 | Rastogi | |
| 2019/0362408 A1* | 11/2019 | Srinivasan | G06Q 30/0201 705/7.29 |
| 2020/0366745 A1* | 11/2020 | Stull | H04L 67/18 |

OTHER PUBLICATIONS

Winlock, Tess. "ShelfScanner: Toward Real-Time Detection of Groceries for the Visually Impaired." Order No. 1477949 University of California, San Diego, 2010. Ann Arbor: ProQuest. Web. Apr. 20, 2022. (Year: 2010).*

Bai, Lihua. "Handling Unobserved Substitutions among Alternatives through Choice Models: Applications for Assortment Planning and Optimization in Retail." Order No. 3594360 University of Miami, 2013. Ann Arbor: ProQuest. Web. Aug. 2, 2022. (Year: 2013).*

Kirk, George Alan. "Price Promotions and Retail Store Profitability: The Influence of Direct Substitutes, Close Substitutes, and Complementary Goods." Order No. 9711297 Texas Tech University, 1996. Ann Arbor: ProQuest. Web. Feb. 16, 2023. (Year: 1996).*

Kourouthanasis, P., et al.; "Consumers and Pervasive Retail"; https://citeseerx.ist.psu.edu/viewdoc/download?doi=10.1.1.59.444 &rep=rep1&type=pdf; pp. 1-12.

* cited by examiner

SYSTEMS AND METHODS FOR AUTOMATICALLY RECOMMENDING AN ITEM TO A CUSTOMER WHILE SHOPPING AT A RETAIL STORE

CROSS-REFERENCE TO RELATED APPLICATIONS

This application claims the benefit of U.S. Provisional Application No. 62/916,038 filed Oct. 16, 2019 and U.S. Provisional Application No. 63/008,312 filed Apr. 10, 2020, both of which are incorporated herein by reference in their entirety.

TECHNICAL FIELD

This invention relates generally to automatically recommending an item to a customer.

BACKGROUND

Generally, a retail store periodically changes locations of items for sale depending on the retail store's given sales strategy for that period. For example, the retail store may place new items at the entrance of the retail store as a way to advertise the new items to the customer. In another example, the retail store may place related items in the same location to remind the customer of buying the other items the customer may not otherwise remember to buy.

BRIEF DESCRIPTION OF THE DRAWINGS

Disclosed herein are embodiments of systems, apparatuses and methods pertaining to automatically recommending an item to a customer. This description includes drawings, wherein.

Figure 1:
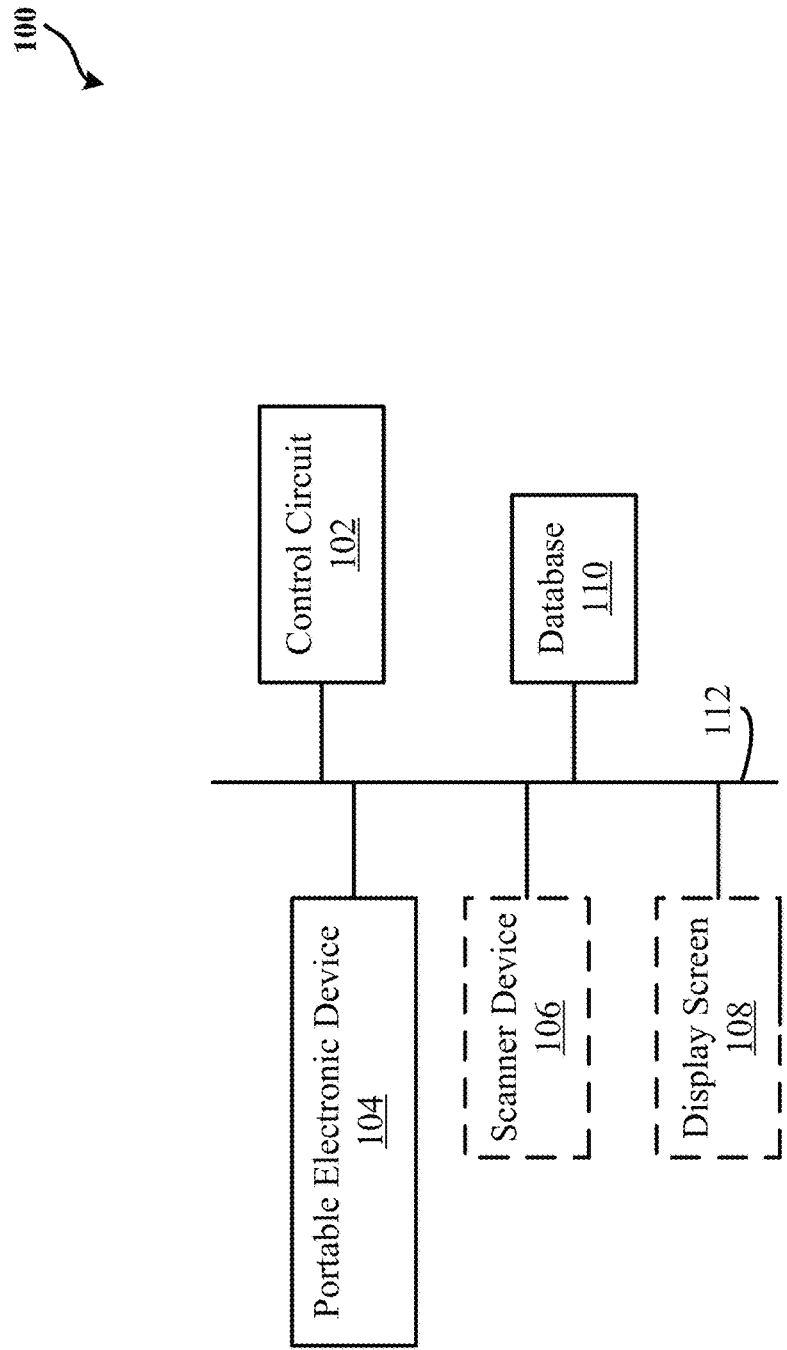
FIG. 1 illustrates a simplified block diagram of an exemplary system for automatically recommending an item to a customer in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for automatically recommending an item to a customer while the customer is shopping at a retail store. By one approach, the system includes a first item of a plurality of items available for purchase at a retail store. Alternatively or in addition to, the system may include a second item of the plurality of items. In one configuration, the second item may be located in proximity to the first item within the retail store. By another approach, the system may include a portable electronic device associated with a user that is shopping at the retail store. In some implementations, the portable electronic device may obtain identifying data corresponding to the first item collected by the user for purchase while the user is shopping at the retail store. Alternatively or in addition to, the portable electronic device may add the first item to an electronic shopping list. Alternatively or in addition to, the portable electronic device may display the electronic shopping list including the first item to the user.

In some implementations, the system may include a control circuit communicatively coupled to the portable electronic device via a network. For example, the control circuit may receive data associated with the first item in response to obtaining the identifying data corresponding to the first item by the portable electronic device. In one configuration, the control circuit may determine a location in the retail store of the first item based on the received data. In another configuration, the control circuit may determine that the second item is located in proximity to the location of the first item in the retail store. Alternatively or in addition to, the control circuit may determine whether the second item would be within a threshold probability of likelihood of being selected by the user if presented to the user. By one approach, the control circuit may, in response to the determination that the second item is located in proximity to the first item in the retail store and the determination that the second item would be within the threshold probability of likelihood of being selected by the user and in response to the first item being added to the electronic shopping list, cause the portable electronic device to display a suggestion for the user to add the second item to the electronic shopping list. In such an approach, the control circuit may, in response to the user selecting to add the second item, update the electronic shopping list to include the second item.

In some embodiments, a method for automatically recommending an item to a customer while the customer is shopping at a retail store. The method includes obtaining, by a portable electronic device associated with a user that is shopping at the retail store, identifying data corresponding to a first item collected by the user for purchase while the user is shopping at the retail store. In one scenario, the first item of a plurality of items may be available for purchase at the retail store. In another scenario, the second item of the plurality of items may be located in proximity to the first item within the retail store. By one approach, the method may include adding, by the portable electronic device, the first item to an electronic shopping list. In one configuration, the method may include displaying, by the portable electronic device, the electronic shopping list including the first item to the user. In some implementations, the method may include receiving, by a control circuit communicatively coupled to the portable electronic device via a network, data associated with the first item in response to obtaining the identifying data corresponding to the first item by the portable electronic device. By one approach, the method may include determining, by the control circuit, a location in the retail store of the first item based on the received data.

Alternatively or in addition to, the method may include determining, by the control circuit, that the second item is located in proximity to the location of the first item in the retail store. In some configurations, the method may include determining, by the control circuit, whether the second item would be within a threshold probability of likelihood of being selected by the user if presented to the user. By one approach, the method may include, in response to the determination that the second item is located in proximity to the first item in the retail store and the determination that the second item would be within the threshold probability of likelihood of being selected by the user and in response to the first item being added to the electronic shopping list, causing, by the control circuit, the portable electronic device to display a suggestion for the user to add the second item to the electronic shopping list. In one example, the method may include, in response to the user selecting to add the second item, updating, by the control circuit, the electronic shopping list to include the second item.

In some embodiments, a system for automatically recommending an item to a customer while the customer is shopping at a retail store. The system includes a plurality of items available for purchase at a retail store. In some embodiments, the system includes a portable electronic device associated with a user that is shopping at the retail store By one approach, the portable electronic device may obtain identifying data corresponding to a first item collected by the user for purchase while the user is shopping at the retail store and add the first item to an electronic shopping list of items to purchase. In some embodiments, the system includes a control circuit. By one approach, the control circuit may communicatively couple to the portable electronic device via a network. In some embodiments, the control circuit may receive data associated with the first item in response to obtaining the identifying data corresponding to the first item by the portable electronic device. In some embodiments, the control circuit may determine a location in the retail store of the first item based on the received data. In some embodiments, the control circuit may identify one or more items previously purchased by the user that are located within a threshold proximity to the location of the first item in the retail store. In some embodiments, the control circuit may determine a most frequently bought item of the identified one or more items previously purchased by the user. In yet some embodiments, the control circuit may cause the portable electronic device to display a suggestion for the user to collect the most frequently bought item and add the most frequently bought item to the electronic shopping list of items to purchase.

In some embodiments, a method for automatically recommending an item to a customer while the customer is shopping at a retail store. By one approach, the method includes obtaining, by a portable electronic device associated with a user, identifying data corresponding to a first item collected by the user for purchase while the user is shopping at a retail store and add the first item to an electronic shopping list of items to purchase. In some embodiments, the method may include receiving, by a control circuit communicatively coupled to the portable electronic device via a network, data associated with the first item in response to obtaining the identifying data corresponding to the first item by the portable electronic device. In some embodiments, the method may include determining, by the control circuit, a location in the retail store of the first item based on the received data. In some embodiments, the method may include identifying, by the control circuit, one or more items previously purchased by the user that are located within a threshold proximity to the location of the first item in the retail store. In some embodiments, the method may include determining, by the control circuit, a most frequently bought item of the identified one or more items previously purchased by the user. In some embodiments, the method may include causing, by the control circuit, the portable electronic device to display a suggestion for the user to collect the most frequently bought item and add the most frequently bought item to the electronic shopping list of items to purchase.

To illustrate, FIGS. 1-12 are described below. For example, FIG. 1 illustrates a simplified block diagram of an exemplary system 100 for automatically recommending an item to a customer in accordance with some embodiments. The system 100 includes a portable electronic device 104. In one example, the portable electronic device 104 may include a smartphone, a mobile phone, an iPad, a laptop, a smartwatch, and/or a tablet, among other types of electronic device capable of being carried and/or transported from one location to another with ease. By one approach, the portable electronic device 104 may include a scanner device 106 and/or a display screen 108. In one example, the scanner device 106 may include an electronic device that optically scans images, digital code (e.g., Universal Product Code (UPC), QR code, a barcode, etc.) printed text, handwriting, and/or an object and converts it to a digital image and/or data. By one approach, the system 100 may include a control circuit 102. In one example, the portable electronic device 104 may be communicatively coupled to the control circuit 102 via a network 112. In one scenario, the network 112 may include wire and/or wireless network, Internet, Wi-Fi, local area network, and/or wide area network, among other types of communication networks capable of coupling one electronic device to another one or more electronic devices. Alternatively or in addition to, the system 100 may include a database 110. In one example, the database 110 may include a random access memory (RAM), a read only memory (ROM), magnetic based storage devices, optical storage media, cloud storage, hard disk drive, optical disk drive, a solid-state drive, one or more of universal serial bus (USB) stick or drive, and/or a flash memory secure digital (SD) card, among other types of storage medium capable of storing electronic data.

Figure 2:
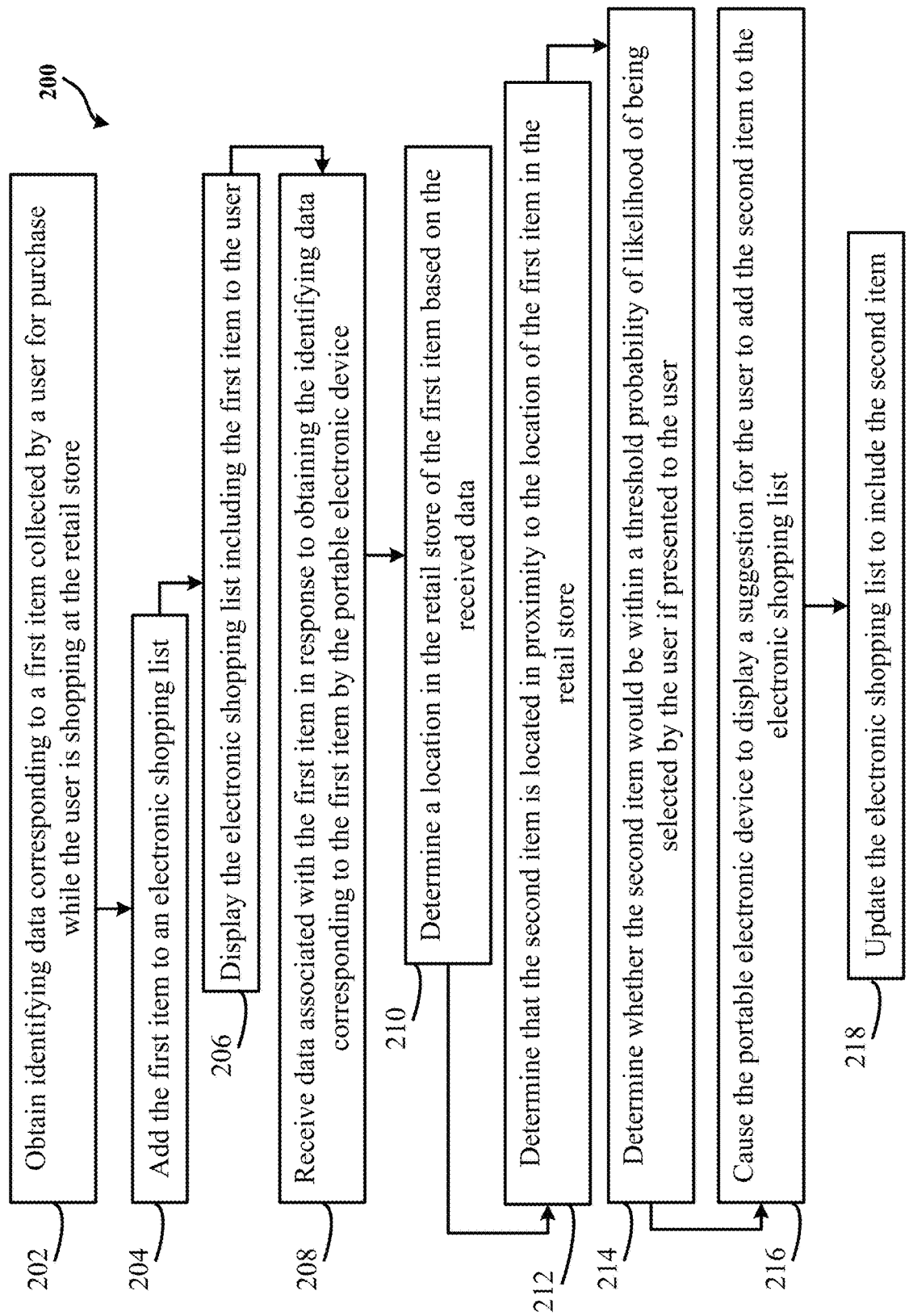
FIG. 2 shows a flow diagram of an exemplary process of automatically recommending an item to a customer in accordance with some embodiments.

To further illustrate, FIG. 1 is described concurrently with FIG. 2. For example, FIG. 2 shows a flow diagram of an exemplary process of automatically recommending an item to a customer in accordance with some embodiments. In an illustrative non-limiting example, the portable electronic device 104 may include an application configured to communicatively couple with the control circuit 102 when a user is at a retail store and/or when the user activates the application. By one approach, a user may use the scanner device 106 to optically scan an image of the first item, an identifier associated with the first item, and/or a text on a surface of the first item. In one configuration, the first item may be an item selectively scanned by the user while shopping at the retail store and/or while strolling down the aisle of the retail store. In some implementations, in response to scanning the first item, the first item may be added to an electronic shopping list associated with the user. For example, the electronic shopping list may include an electronic shopping cart and/or an electronic listing associated with a user's profile. In another example, the electronic shopping list may indicate a listing of one or more items to be purchased by the user prior to exiting the retail store. In some configurations, the display screen 108 may show and/or display the first item on the electronic shopping list. Alternatively or in addition to, the scanned data associated with the first item may be sent to the control circuit 102.

In some embodiments, the portable electronic device 104 may obtain identifying data corresponding to the first item collected by the user for purchase while the user is shopping at the retail store, at step 202. By one approach, the portable electronic device 104 may obtain identifying data corresponding to the first item by scanning an image of the first item, an identifier associated with the first item, and/or a text on a surface of the first item, by reading a radio frequency identification (RFID) tag, and/or by an input from a user. In some implementations, the portable electronic device 104 may add the first item to an electronic shopping list, at step 204. For example, the electronic shopping list may include an electronic shopping cart and/or an electronic listing associated with a user's profile. In another example, the electronic shopping list may indicate a listing of one or more items to be purchased by the user prior to exiting the retail store. Alternatively or in addition to, the portable electronic device 104 may display the electronic shopping list including the first item to the user, at step 206. In some implementations, the control circuit 102 may receive data associated with the first item in response to obtaining the identifying data corresponding to the first item by the portable electronic device 104, at step 208.

In some configurations, based on the received data, the control circuit 102 may determine a location in the retail store of the first item, at step 210. By yet another approach, the control circuit 102 may receive data associated with the first item in response to obtaining the identifying data corresponding to the first item by the portable electronic device 104. For example, to determine the location of the first item in the retail store, the control circuit may access the database 110. By one approach, the database 110 may store a corresponding location in the retail store for each of the plurality of items to determine the location of the first item in the retail store. In such an approach, a location for each item and/or product item in the retail store may be stored in the database 110. For example, Kellogg's Corn Flakes Breakfast Cereal may be located in aisle 3, rack 6, shelf 1. As such, in one scenario, when the portable electronic device 104 obtains the identifying data corresponding to the Kellogg's Corn Flakes Breakfast Cereal, the control circuit 102 may access the database 110 to determine the location of the Kellogg's Corn Flakes Breakfast Cereal in the retail store (e.g., aisle 3, rack 6, shelf 1). In some configurations, based on obtaining data corresponding to the first item, the control circuit 102 may be triggered to determine the location in the retail store of the first item. For example, to determine the location of the first item in the retail store, the control circuit 102 may determine the location of the portable electronic device 104 based on the portable electronic device's 104 coupling with a wireless access point in the retail store. As such, the control circuit 102 may estimate that the location of the first item is within a threshold distance from the determined location of the portable electronic device 104.

By yet another approach, the control circuit 102 may receive the scanned data associated with the first item in response to the first item being scanned by the user using the scanner device 106. In some configurations, based on the scanned data, the control circuit 102 may determine a location in the retail store of the first item. By yet another approach, the control circuit 102 may receive the scanned data associated with the first item in response to obtaining the identifying data corresponding to the first item by the portable electronic device 104. For example, to determine the location of the first item in the retail store, the control circuit may access the database 110. By one approach, the database 110 may store a corresponding location in the retail store for each of the plurality of items to determine the location of the first item in the retail store. In such an approach, a location for each item and/or product item in the retail store may be stored in the database 110. For example, Kellogg's Corn Flakes Breakfast Cereal may be located in aisle 3, rack 6, shelf 1. As such, in one scenario, when a user scans the Kellogg's Corn Flakes Breakfast Cereal, the control circuit 102 may access the database 110 to determine the location of the Kellogg's Corn Flakes Breakfast Cereal in the retail store (e.g., aisle 3, rack 6, shelf 1). In another configurations, based on receiving the scanned data, the control circuit 102 may be triggered to determine the location in the retail store of the first item. For example, to determine the location of the first item in the retail store, the control circuit 102 may determine the location of the portable electronic device 104 based on the portable electronic device's 104 coupling with a wireless access point in the retail store. As such, the control circuit 102 may estimate that the location of the first item is within a threshold distance from the determined location of the portable electronic device 104.

In some embodiments, the control circuit 102 may determine that a second item is located in proximity and/or within another threshold distance from the location of the first item in the retail store, at step 212. In such an embodiment, the control circuit 102 may determine one or more items that are proximate (e.g., within a short distance from the first item, within an average arm's length from the first item, within one or more feet from the first item, and/or within a rack or two from the first item, etc.) from the location of the first item based on the database 110. In some implementations, the control circuit 102 may determine whether the second item is within a threshold probability of likelihood of being selected by the user when presented to the user, at step 214. For example, when the first item is added to the electronic shopping list, the control circuit 102 may cause the display screen 108 and/or the portable electronic device 104 to show and/or display the second item. In such an example, the user may see a visual and/or a textual representation of the second item. In some configurations, to determine whether the second item is within a threshold probability of likelihood of being selected by the user when presented to the user, the control circuit 102 may access the database 110 for a user profile associated with the user. For example, the user profile may include prior purchases of the user. Alternatively or in addition to, the control circuit 102 may include machine learning algorithm that continuously assesses the user's and/or other user's (members) current buying behavior and/or prior purchases and/or affinities, and/or subsequently updates the user profile to include product items (or just items) that is within one or more thresholds probability of likelihood of being selected by the user when presented to the user. For example, the user profile may include a plurality of items that are grouped in accordance with predetermined thresholds probability of likelihood of being selected by the user. By one approach, the machine learning algorithm includes an algorithm that produces one or more models based on input data, such as sampling data, training data, resulting data from the algorithm's interaction with and/or its experience in an environment.

Thus, in response to the determination that the second item is within the threshold probability of likelihood of being selected by the user and in response to the first item being added to the electronic shopping list, control circuit 102 may cause the display screen 108 and/or the portable electronic device 104 to show an image of the second item and/or a textual representation of the second item. Thus, by one approach, the control circuit 102 may recommend the second item to the user based on the second item's proximity to the first item and based on the control circuit's 102 determination that the second item is within a threshold probability of likelihood of being selected by the user when presented to the user. In such an approach, the control circuit 102 may prompt the user whether to add the second item in the electronic shopping list. In one example, in response to the user selecting to add the second item, the control circuit 102 may update the electronic shopping list to include the second item in the listing of the one or more items to be purchased by the user prior to exiting the retail store.

In some embodiments, in response to the determination that the second item is located in proximity to the first item in the retail store and the determination that the second item would be within the threshold probability of likelihood of being selected by the user and in response to the first item being added to the electronic shopping list, the control circuit 102 may cause the portable electronic device 104 to display a suggestion for the user to add the second item to the electronic shopping list, at step 216. In such an embodiment, the control circuit 102 may, in response to the user selecting to add the second item, update the electronic shopping list to include the second item, at step 218. Alternatively or in addition to, the control circuit 102 may cause the portable electronic device 104 to display the suggestion for the user to add the second item to the electronic shopping list with an indication that the second item is in proximity to the first item. For example, the portable electronic device 104 may display a visual and/or a textual map providing directions to the second item. In another example, the portable electronic device 104 may display a visual map and/or a textual map providing directions to the second item in response to the user selecting to add the second item.

In some embodiments, the control circuit 102 may periodically recommend a second item based on the second item's proximity to the first item and based on the control circuit's 102 determination that the second item is within a threshold probability of likelihood of being selected by the user when presented to the user. For example, the control circuit 102 may make item recommendations to the user only twice per shopping trip to the retail store. In another example, the control circuit 102 may make item recommendation to the user every one or more first items that are scanned by the user while shopping at the retail store. Alternatively or in addition to, the control circuit 102 may recommend a second item to the user based on a decision tree having a plurality of decision levels. For example, the control circuit 102 may identify a number of second items that are in proximity to the location of the first item. In such an example, the control circuit 102 may filter out those items in the identified second items that do not meet the threshold probability of likelihood of being selected by the user when presented to the user. By one approach, the control circuit 102 may identify from the remaining items those that are associated as items having instant savings discount. In such an approach, if there are more than one items still remaining, the control circuit 102 may recommend the second item to the user that is associated with the highest threshold probability of likelihood of being selected by the user.

By another approach, the control circuit 102 may identify from the remaining items (after identifying those items in proximity to the first item) those that are associated as new items. In such an approach, if there are more than one items still remaining, the control circuit 102 may recommend the second item to the user that is associated with the highest threshold probability of likelihood of being selected by the user. By yet another approach, the control circuit 102 may identify from the remaining items (after identifying those items in proximity to the first item) those that are associated as sponsored products (e.g., products that the manufacturer are sponsoring to be advertised). In such an approach, if there are more than one items still remaining, the control circuit 102 may recommend the second item to the user that is associated with the highest threshold probability of likelihood of being selected by the user. Alternatively or in addition to, when the user selects to add the second item that is associated with one of the sponsored products, the control circuit 102 may provide a signal and/or a reporting message and/or may store and/or update a count of selected second items associated with the manufacturer to allow the retail store to be paid for the advertisement of the selected second item.

In some embodiments, the control circuit 102 may recommend the second item that meets the threshold probability of likelihood of being selected by the user and that the second item being in one or more predetermined product categories. For example, the one or more predetermined product categories may include classes of items (e.g., kitchen item, automotive items, garden item, meat items, organic items, etc.) and/or hybrid categories (e.g., classes of items coupled with particular time period (e.g., Halloween, Christmas, Back to School, etc.) and/or membership levels). In yet some embodiments, the control circuit 102 may cause the display screen 108 to display a textual and/or a visual map to the second item in response to the user selecting to add the second item to the electronic shopping list.

Figure 3:
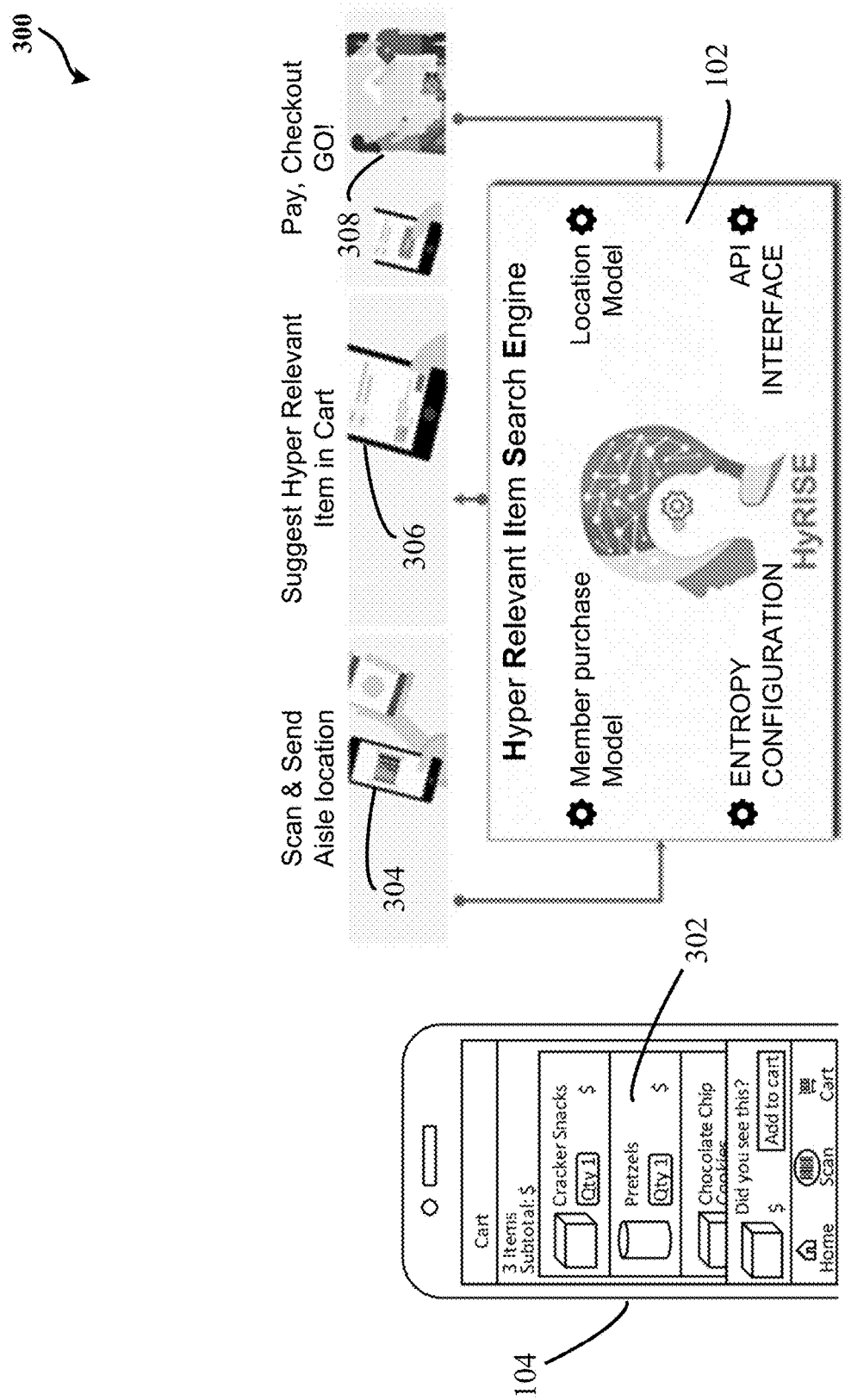
FIG. 3 illustrates a simplified block diagram of an exemplary system for automatically recommending an item to a customer in accordance with some embodiments.

In another illustrative non-limiting example, FIG. 3 illustrates a simplified block diagram of an exemplary system 300 for automatically recommending an item to a customer in accordance with some embodiments. In some implementations, the system 300 may correspond to the system 100 of FIG. 1. The system 300 includes the portable electronic device 104. By one approach, the portable electronic device 104 may include an application associated with a retail store and configured to show and/or display a first item on an electronic shopping list 302. For example, the electronic shopping list 302 may indicate a listing of one or more items to be purchased by the user prior to exiting the retail store. In one configuration, a first item may be scanned by the user. In such information, the scanned data 304 may be sent to the control circuit 102 and cause the control circuit 102 to add the first item on the electronic shopping list 302. By one approach, based on the scanned data 304, the control circuit 102 may suggest and/or recommend 306 a second item to the user. In one example, in response to the second item being selected by the user and/or added to the electronic shopping list 302, the user may subsequently complete its shopping through the application 308. By one approach, the user may leave the retail store without having to stop by at a cashier station since the user used the application to pay for the items listed on the electronic shopping list 302. In response, the control circuit 102 may subsequently execute the machine learning algorithm to output and/or update the user profile and/or a listing of items and/or associations of item (or products) associated with the user profile of having a threshold probability of likelihood of being selected by the user when presented to the user.

Figure 4:
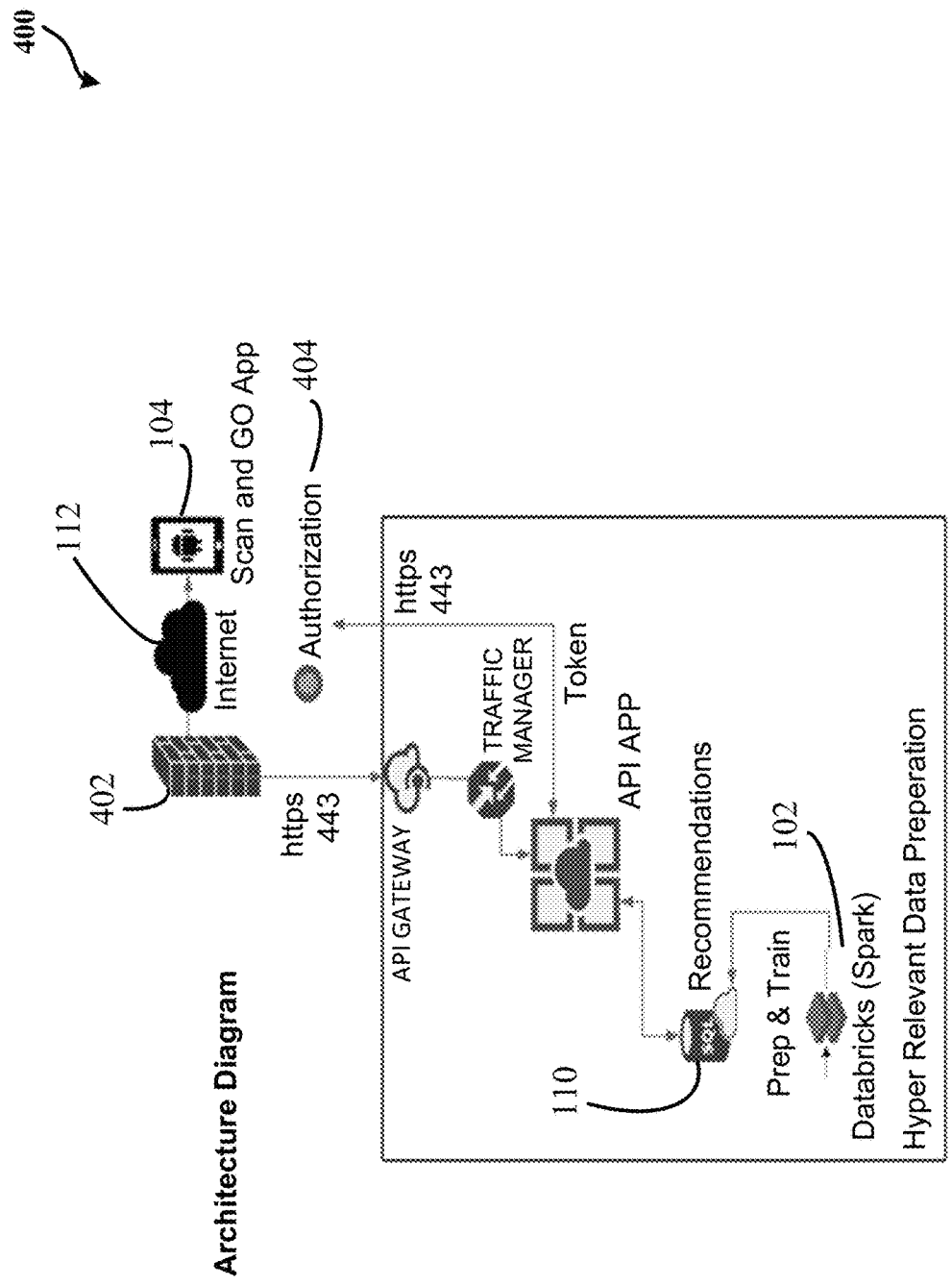
FIG. 4 illustrates a simplified block diagram of an exemplary system for automatically recommending an item to a customer in accordance with some embodiments.

In another illustrative non-limiting example, FIG. 4 illustrates a simplified block diagram of an exemplary system 400 for automatically recommending an item to a customer in accordance with some embodiments. In some implementations, the system 400 may correspond to one or more elements of the system 100 of FIG. 1 and/or the system 300 of FIG. 3. The system 400 includes the portable electronic device 104. By one approach, in response to the portable electronic device 104 scanning the scanned data of the first item, the portable electronic device 104 may couple to the control circuit 102 via the network 112 (e.g., Internet). In some implementations, the control circuit 102 may be behind a firewall 402 and coupled to the network 112 via an application programming interface gateway (API). In one example, routing, communication, and/or authentication between the portable electronic device 104 and the control circuit 102 may be via a traffic manager, an API application and/or an authentication server 404. By one approach, the authentication server 404 may authenticate transactions between the portable electronic device 104 and the control circuit 102. By another approach, the database 110 may include a structured query language (SQL) database storing a plurality of recommendations output by the control circuit 102 during an execution of the machine learning algorithm. In one example, the control circuit 102 may execute the machine learning algorithm to prepare and train the control circuit 102 to determine a plurality of items that would meet one or more thresholds probability of likelihood of being selected by the user when presented to the user.

Figure 5:
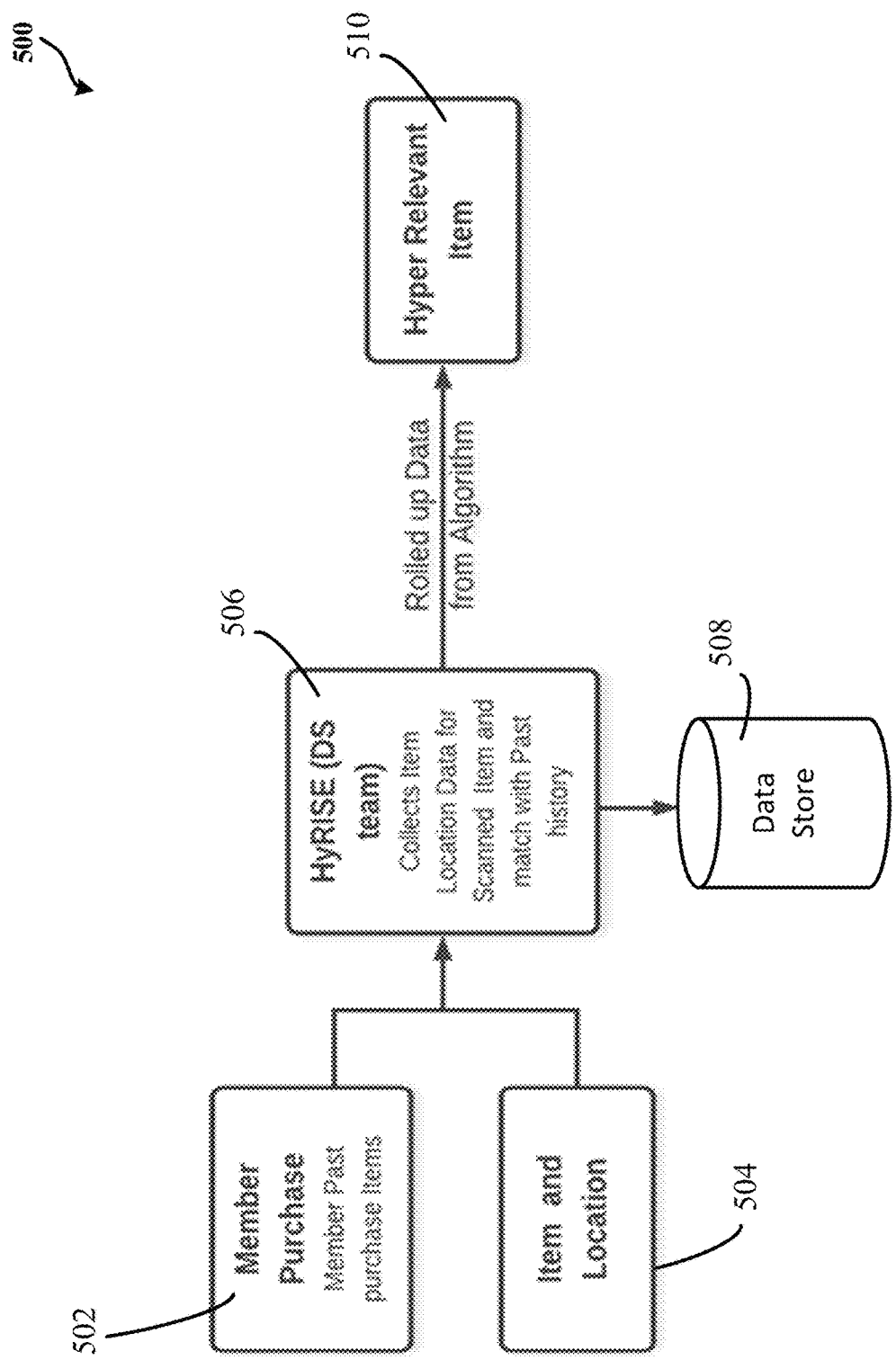
FIG. 5 shows a flow diagram of an exemplary process of automatically recommending an item to a customer in accordance with some embodiments.

In another illustrative non-limiting example, FIG. 5 shows a flow diagram of an exemplary process (or method) 500 of automatically recommending an item to a customer in accordance with some embodiments. In some implementations, the method 500 and/or the method 200 of FIG. 2 may be implemented in the system 100 of FIG. 1, the system 300 of FIG. 3, and/or the system 400 of FIG. 4. The method 500 includes scanning of a first item using the portable electronic device 104 by a user while the user is shopping at a retail store. By one approach, the control circuit 102 may receive the scanned data. In one configuration, the method 500 may include, at step 502, determining, by the control circuit 102, user's (or member user's) prior purchase items. Alternatively or in addition to, the method 500 may include, at step 504, determining, by the control circuit 102, a location in the retail store of the first item based on the scanned data. Alternatively or in addition to, the method 500, at step 504, may include a plurality of items that are located in proximity to the location of the first item. In some implementations, the method 500 may include matching and/or identifying, by the control circuit 102, which one of the plurality of items that are located in proximity to the location of the first item that had been previously purchased by the user, at step 506. Alternatively or in addition to, the method 500 may include, at step 508, accessing, by the control circuit 102, the database 110, datastore, the user profile, and/or output of the machine learning algorithm to determine which one of the plurality of items that are located in proximity to the location of the first item is within a threshold probability of likelihood of being selected by the user when presented to the user. Alternatively or in addition to, the method 500 may include causing, by the control circuit 102, the portable electronic device 104 to display or show the recommended second item (that is located in proximity to the location of the first item and meeting the threshold probability of likelihood of being selected by the user when presented to the user) and/or the hyper relevant item, at step 510.

Figure 6:
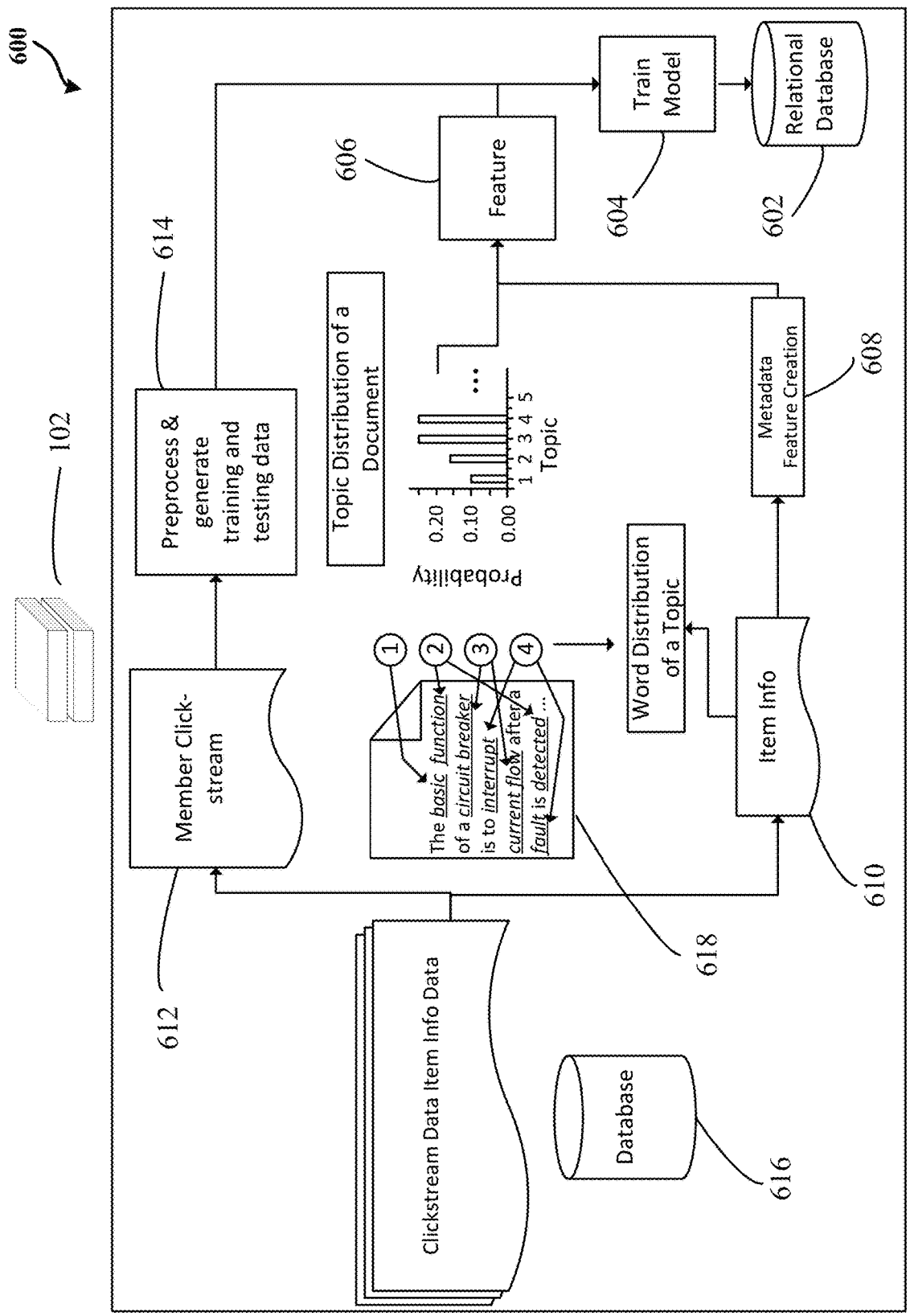
FIG. 6 illustrates a simplified block diagram of an exemplary system for automatically recommending an item to a customer in accordance with some embodiments.

In another illustrative non-limiting example, FIG. 6 illustrates a simplified block diagram of an exemplary system 600 for automatically recommending an item to a customer in accordance with some embodiments. In some implementations, the system 600 may correspond to one or more elements of the system 100 of FIG. 1, the system 300 of FIG. 3, and/or the system 400 of FIG. 4. In some implementations, the method 200 of FIG. 2 and/or the method 500 of FIG. 5 may be implemented in the system 600. The system 400 includes the control circuit 102. By one approach, the control circuit 102 may execute the machine learning algorithm to determine for each item of the plurality of items a threshold probability of likelihood of being selected by a user when presented to the user. For example, a general database 616 may include a plurality of user data associated with usage and/or action performed by a plurality of users at an eCommerce website and/or activities on the internet. By one approach, the control circuit 102 may access the general database 616 to determine item data 610 associated with a plurality of items for purchase at a retail store. In some configurations, the item data 610 may be processed by the control circuit 102 to determine statistical information 618 usable in determining one or more features that are input to train one or more models 604 of the machine learning algorithm. Alternatively or in addition to, the item data 610 may be input to a Metadata Feature Creation algorithm 608 that outputs data usable in determining one or more features 606 that are input to train one or more models 604 of the machine learning algorithm. Alternatively or in addition to, the control circuit 102 may determine member data 612 based on an access to the general database 616. By one approach, the control circuit 102 may input the member data 612 to a Preprocess & Generate Training and Testing Data algorithm 614 that outputs data that are input to train one or more models 604 of the machine learning algorithm. In some implementation, in response to training the one or more models 604, the control circuit 102 may cause a relational database 602 to store the resulting data. By one approach, the database 110 may include the general database 616 and/or the relational database 602. In some configurations, the data stored in the relational database 602 may be used to determine which one of the plurality of items may be associated as having a threshold probability of likelihood of being selected by a user when presented to the user.

Figure 7:
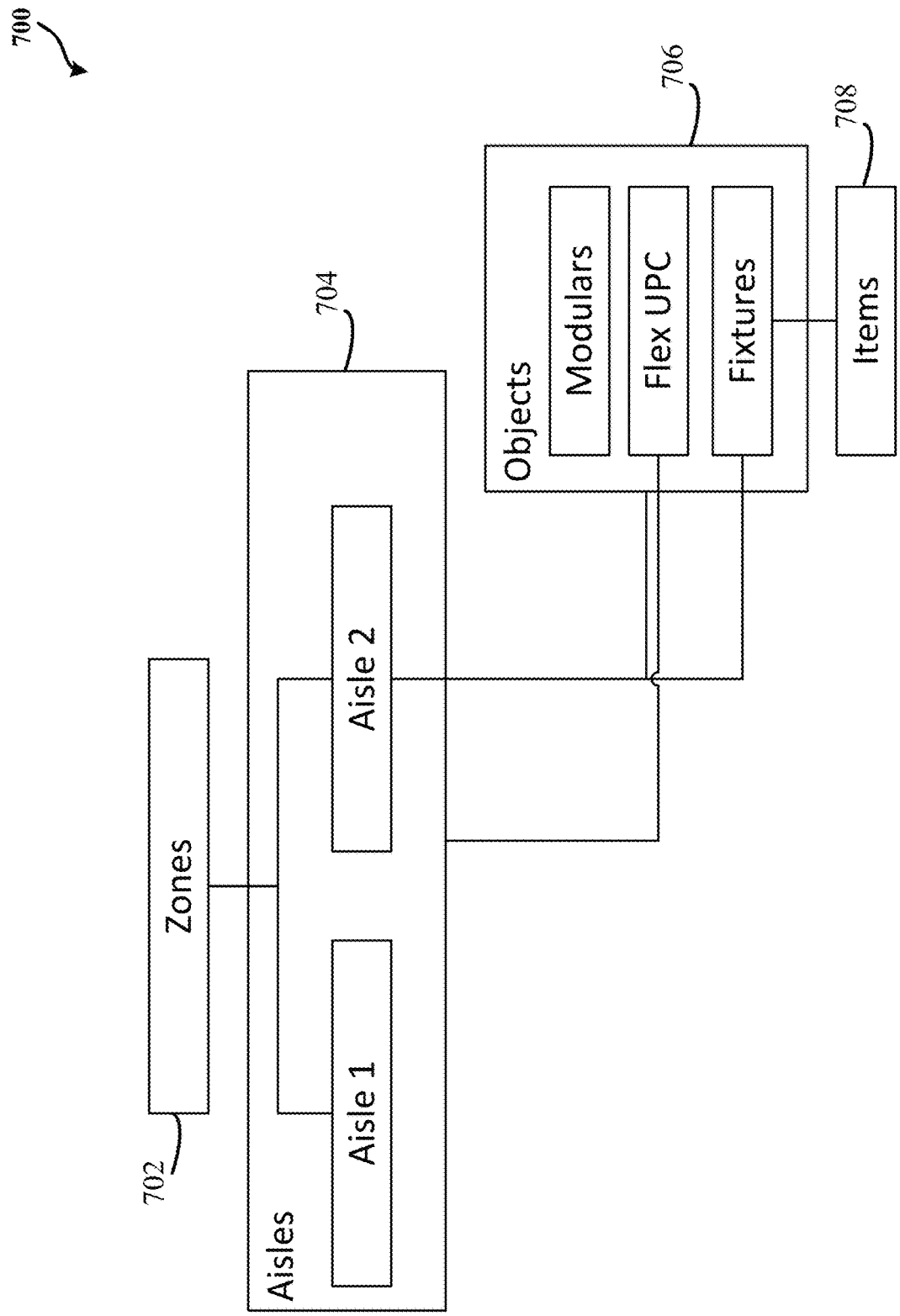
FIG. 7 illustrates a simplified block diagram of an exemplary system for automatically recommending an item to a customer in accordance with some embodiments.

In another illustrative non-limiting example, FIG. 7 illustrates a simplified block diagram of an exemplary system 700 for automatically recommending an item to a customer in accordance with some embodiments. In some implementations, the system 700 may correspond to one or more elements of the system 100 of FIG. 1, the system 300 of FIG. 3, and/or the system 400 of FIG. 4. In some implementations, the method 200 of FIG. 2 and/or the method 500 of FIG. 5 may be implemented in one or more elements of the system 700. For example, a retail store may be apportioned to a plurality of zones. By one approach, a zone 702 may correspond to a meat area, a produce area, a kitchen tools area, a women clothing area, a men clothing area, and/or a gardening area, to name a few. By another approach, the zone 702 may include one or more aisles 704. In one configuration, each aisle may be associated with one or more objects 706 (e.g., modular, flex UPC, fixtures, etc.). In one example, the database 110 may include a plurality of associations of zones 702, aisles 704, objects 706, and/or items 708. In one scenario, a particular association may include a particular zone, a particular set of aisles, a particular object associated with the particular set of aisles, and/or a particular set of items associated with the particular object. As such, when the control circuit 102 determines the location of a first item selectively scanned and/or collected by a user, the control circuit 102 may determine which set of second items and/or a particular second item is located in proximity to the first item based on accessing the database 110 and its associations.

Figure 8:
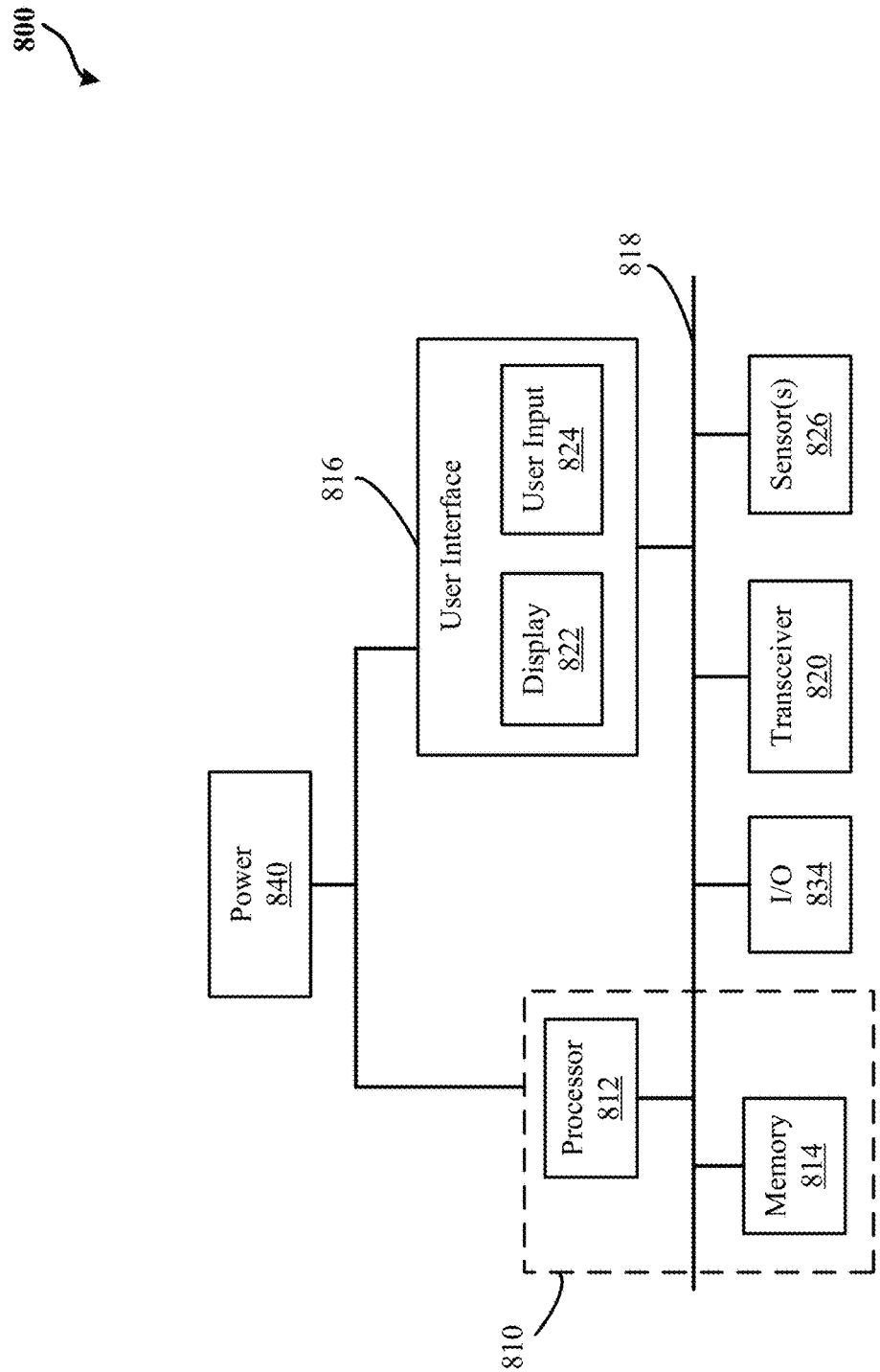
FIG. 8 illustrates an exemplary system for use in implementing methods, techniques, devices, apparatuses, systems, servers, sources and automatically recommending an item to a customer, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 8 illustrates an exemplary system 800 that may be used for implementing any of the components, circuits, circuitry, systems, functionality, apparatuses, processes, or devices of the system 100 of FIG. 1, the method 200 of FIG. 2, the system 300 of FIG. 3, the system 400 of FIG. 4, the method 500 of FIG. 5, the system 600 of FIG. 6, the system 700 of FIG. 7, and/or other above or below mentioned systems or devices, or parts of such circuits, circuitry, functionality, systems, apparatuses, processes, or devices. For example, the system 800 may be used to implement some or all of the system for automatically recommending an item to a customer while the customer is shopping at a retail store, the portable electronic device 104, the scanner device 106, the display screen 108, the control circuit 102, the network 112, the database 110, electronic shopping list 302, the machine learning algorithm, the authentication server 404, the firewall 402, the relational database 602, the general database 616, and/or other such components, circuitry, functionality and/or devices. However, the use of the system 800 or any portion thereof is certainly not required.

By way of example, the system 800 may comprise a processor module (or a control circuit) 812, memory 814, and one or more communication links, paths, buses or the like 818. Some embodiments may include one or more user interfaces 816, and/or one or more internal and/or external power sources or supplies 840. The control circuit 812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 812 can be part of control circuitry and/or a control system 810, which may be implemented through one or more processors with access to one or more memory 814 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 800 may be used to implement one or more of the above or below, or parts of, components, circuits, systems, processes and the like. For example, the system 800 may implement the system for automatically recommending an item to a customer while the customer is shopping at a retail store with the control circuit 102 being the control circuit 812.

The user interface 816 can allow a user to interact with the system 800 and receive information through the system. In some instances, the user interface 816 includes a display 822 and/or one or more user inputs 824, such as buttons, touch screen, track ball, keyboard, mouse, etc., which can be part of or wired or wirelessly coupled with the system 800. Typically, the system 800 further includes one or more communication interfaces, ports, transceivers 820 and the like allowing the system 800 to communicate over a communication bus, a distributed computer and/or communication network (e.g., a local area network (LAN), the Internet, wide area network (WAN), etc.), communication link 818, other networks or communication channels with other devices and/or other such communications or combination of two or more of such communication methods. Further the transceiver 820 can be configured for wired, wireless, optical, fiber optical cable, satellite, or other such communication configurations or combinations of two or more of such communications. Some embodiments include one or more input/output (I/O) interface 834 that allow one or more devices to couple with the system 800. The I/O interface can be substantially any relevant port or combinations of ports, such as but not limited to USB, Ethernet, or other such ports. The I/O interface 834 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 826 to provide information to the system and/or sensor information that is communicated to another component, such as the portable electronic device 104, the scanner device 106, the display screen 108, the control circuit 102, the network 112, the database 110, electronic shopping list 302, the machine learning algorithm, the authentication server 404, the firewall 402, the relational database 602, the general database 616, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 800 comprises an example of a control and/or processor-based system with the control circuit 812. Again, the control circuit 812 can be implemented through one or more processors, controllers, central processing units, logic, software and the like. Further, in some implementations the control circuit 812 may provide multiprocessor functionality.

The memory 814, which can be accessed by the control circuit 812, typically includes one or more processor readable and/or computer readable media accessed by at least the control circuit 812, and can include volatile and/or nonvolatile media, such as RAM, ROM, EEPROM, flash memory and/or other memory technology. Further, the memory 814 is shown as internal to the control system 810; however, the memory 814 can be internal, external or a combination of internal and external memory. Similarly, some or all of the memory 814 can be internal, external or a combination of internal and external memory of the control circuit 812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 814 can store code, software, executables, scripts, data, content, lists, programming, programs, log or history data, user information, customer information, product information, and the like. While FIG. 8 illustrates the various components being coupled together via a bus, it is understood that the various components may actually be coupled to the control circuit and/or one or more other components directly.

Figure 9:
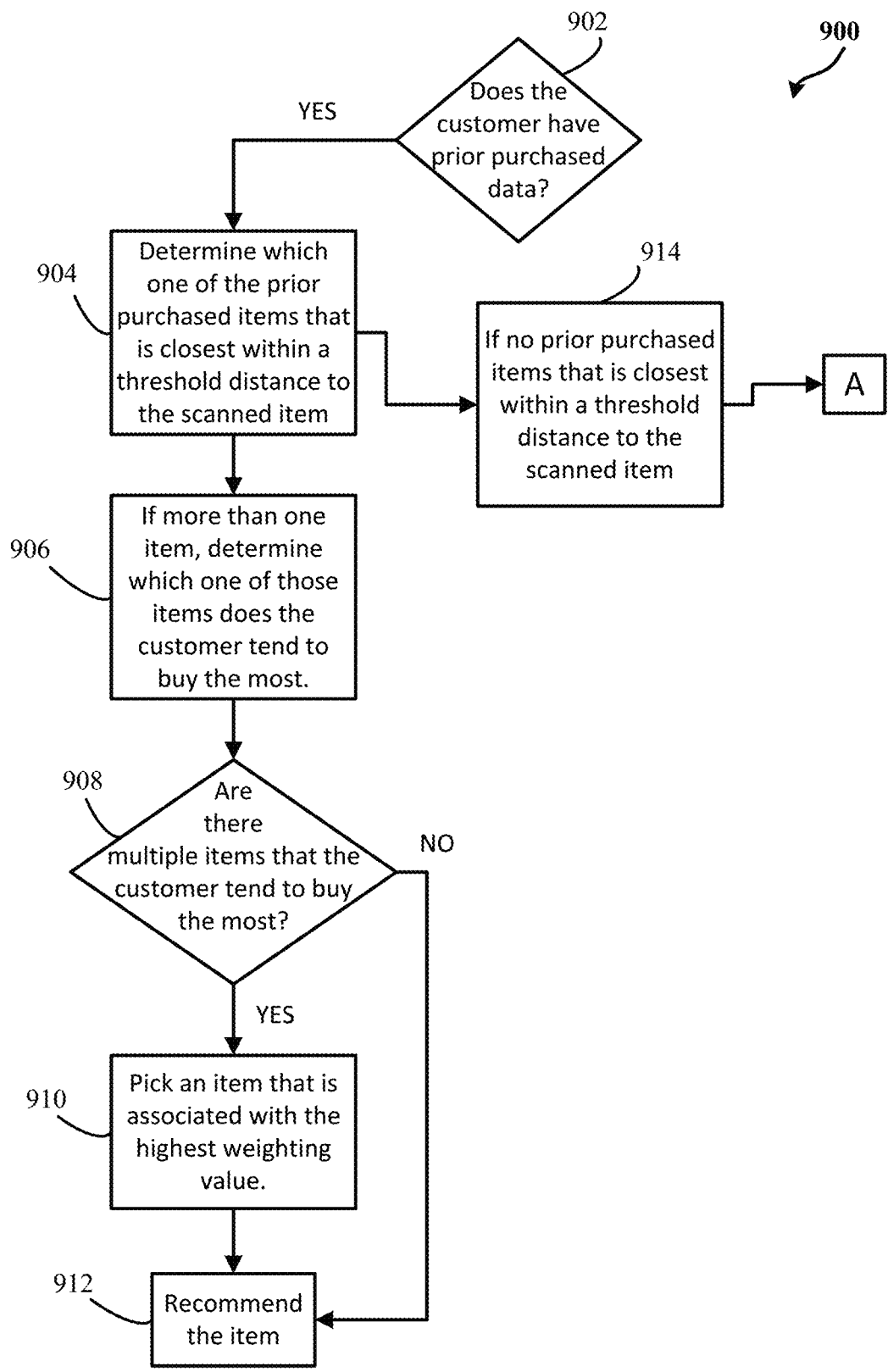
FIG. 9 shows a flow diagram of an exemplary process of automatically recommending an item to a customer in accordance with some embodiments.
Figure 10:
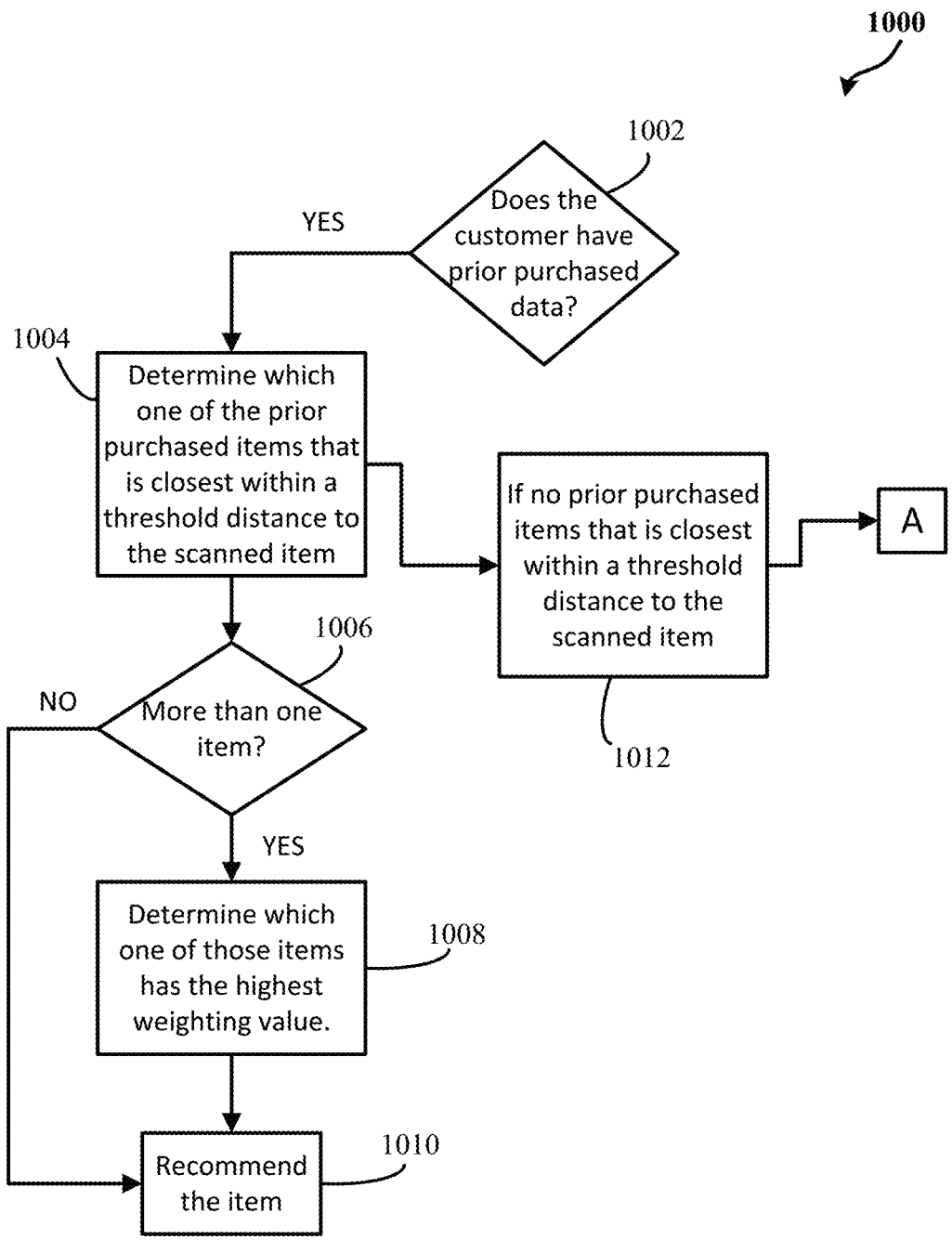
FIG. 10 shows a flow diagram of an exemplary process of automatically recommending an item to a customer in accordance with some embodiments.
Figure 11:
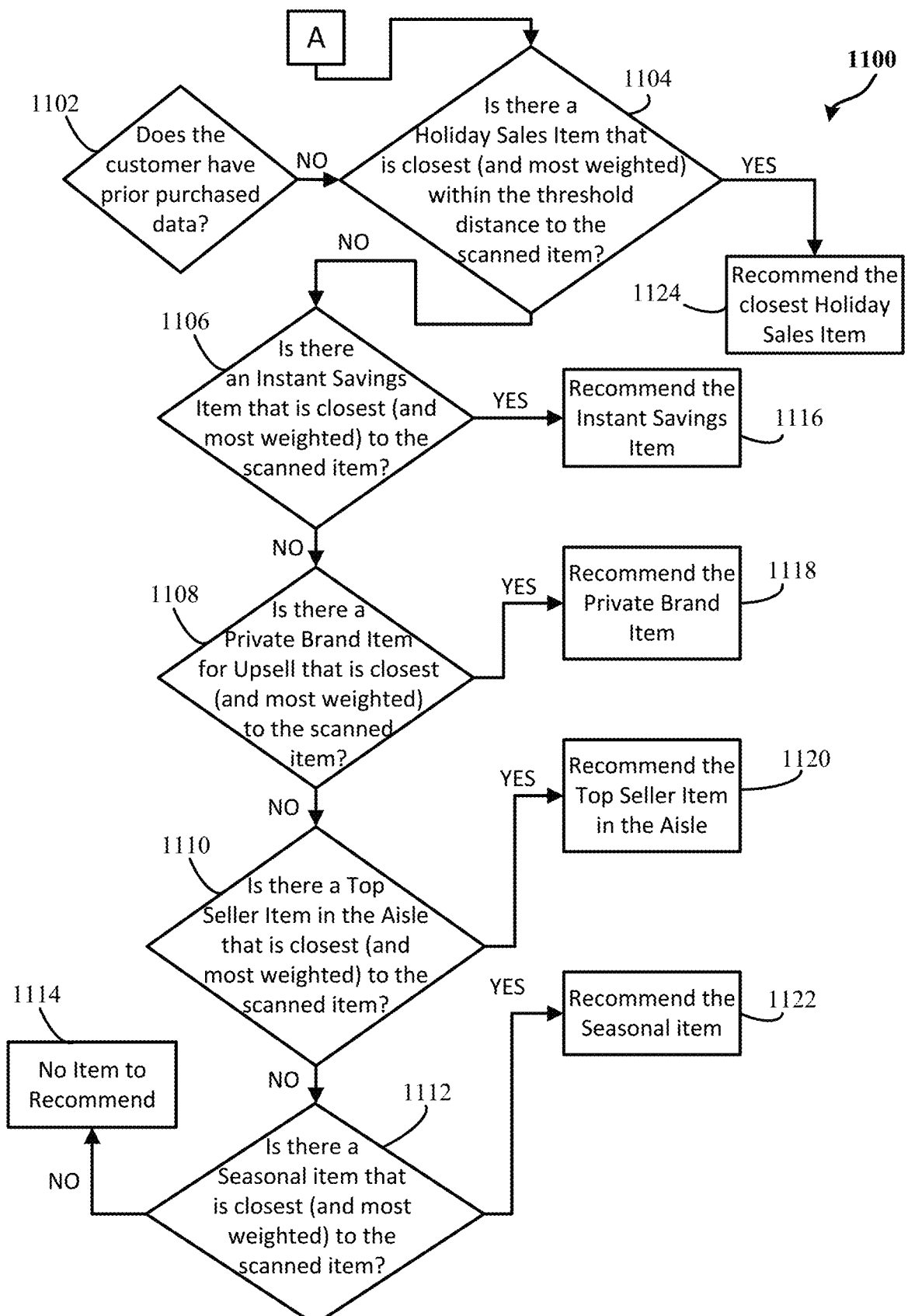
FIG. 11 shows a flow diagram of an exemplary process of automatically recommending an item to a customer in accordance with some embodiments.
Figure 12:
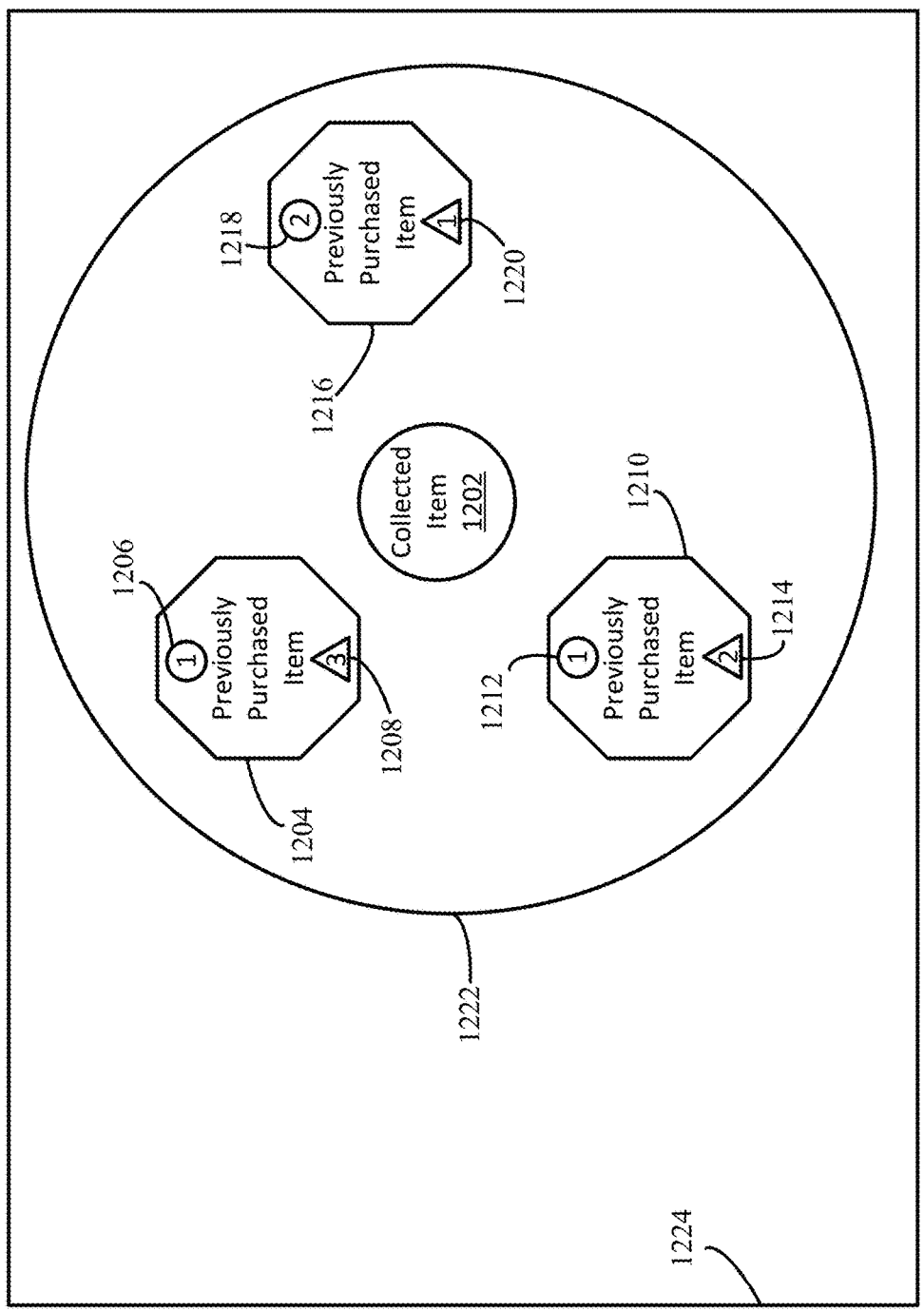
FIG. 12 is a simplified illustration for automatically recommending an item to a customer in accordance with some embodiments.

To further illustrate, FIGS. 9 through 12 are concurrently described below. FIG. 9 shows a flow diagram of an exemplary process/method 900 of automatically recommending an item to a customer in accordance with some embodiments. FIG. 10 shows a flow diagram of an exemplary process/method 1000 of automatically recommending an item to a customer in accordance with some embodiments. FIG. 11 shows a flow diagram of an exemplary process/method 1100 of automatically recommending an item to a customer in accordance with some embodiments. FIG. 12 is a simplified illustration 1200 for automatically recommending an item to a customer in accordance with some embodiments. In some embodiments, one or more of the methods 900, 1000, 1100 may be used and/or implemented by the system 100 of FIG. 1. In some embodiments, the system 100 automatically recommends an item to a customer while the customer is shopping at a retail store. In some embodiments, the system 100 may include a plurality of items available for purchase at a retail store 1224. In some embodiments, the system 100 may include the portable electronic device 104 associated with a user and/or a customer that is shopping at the retail store 1224. By one approach, the portable electronic device may obtain identifying data corresponding to a first item (or a collected item 1202) collected by the user for purchase while the user is shopping at the retail store 1224 and add the collected item 1202 to an electronic shopping list of items to purchase. For example, an identifying data may include Universal Product Code (UPC code), QR code, image of an item, among other ways that the control circuit 102 may identify and/or determine an item and/or a product that the user has collected while shopping at the retail store. By one approach, an electronic shopping list can be associated with a retail store and may be part of an application software operable on the portable electronic device 104. In some embodiments, the portable electronic device 104 is communicatively coupled to the control circuit 102.

In some embodiments, the portable electronic device 104 provides initiation signal to the control circuit 102 when the user enters the retail store 1224. By one approach, the initiation signal may enable the control circuit 102 to determine whether the user has previously purchased items at the retail store 1224, at step 902, 1002, 1102. In some embodiments, the database 110 includes history of purchased data associated with users/customers who had previously purchased items at the retail store 1224. For example, the initiation signal may include one or more user attributes (e.g., user's membership and/or profile information, authentication data enabling the portable electronic device 104 to communicatively couple to the control circuit 102, to name a few) and location data of the portable electronic device 104 (e.g., the location data may include Global Positioning System data, beacon data, WIFI data, among other types of data usable by the control circuit 102 to determine the location of the portable electronic device 104 in the retail store). In some embodiments, the control circuit 102, in response to the receipt of the initiation signal, may provide a store identifier associated with the retail store to the portable electronic device 104. For example, a store identifier may include an alpha code, a symbol, a numeric code, and/or alphanumeric code, a store name, a store address, among other ways to identify a particular store location. By one approach, the store identifier may be stored by the portable electronic device 104.

In some embodiments, the control circuit 102 may communicatively couple to the portable electronic device 104 via the network 112. In some embodiments, the control circuit 102 receives data associated with the collected item 1202 in response to obtaining the identifying data corresponding to the collected item 1202 by the portable electronic device 104. In some embodiments, the data received by the control circuit 102, in response to obtaining the identifying data corresponding to the collected item 1202 by the portable electronic device 104, may include an item identifier associated with the collected item 1202 and a store identifier associated with the retail store 1224. For example, the user may scan the collected item 1202 using the portable electronic device 104. In some examples, the portable electronic device 104 may scan the collected item 1202 via a scanner and/or a camera of the portable electronic device 104. In an illustrative non-limiting example, the collected item 1202 may correspond to an item initially collected by the user and/or one or more subsequent items the user may collect as the user shops in the retail store 1224 and may include one or more items recommended/suggested by the control circuit 102. By one approach, the control circuit 102 may determine a location in a retail store 1224 of the collected item 1202 based on the received data. In some embodiments, the control circuit 102 identifies one or more items previously purchased by the user that are located within a threshold proximity 1222 to the location of the collected item 1202 in the retail store 1224, at step 904, 1004.

In some embodiments, the control circuit 102 may access the database 110 and obtain a location of the collected item 1202. For example, the retail store 1224 may be in a grid system where each product type is associated with an x/y coordinate that facilitate in locating items corresponding to the product type in the retail store 1224. In another example, each shelf in the retail store 1224 may be associated with a particular shelf identifier identifying the location of the shelf in the retail store 1224. In such an example, a collected item 1202 may be associated with a shelf identifier in the database 110 that enables the control circuit 102 to determine the location of the collected item 1202 in the retail store 1224. In FIG. 12, the threshold proximity 1222 is shown as a circular area with a predetermined radius from the collected item 1202. However, the threshold proximity 1222 can also be a rectangular area, an oblong area, a triangular area, and/or any other shapes and various sizes of area relative the collected item 1202. By one approach, the threshold proximity 1222 may include a value and/or a range of values. In some embodiments, the threshold proximity 1222 may be dynamically increased and/or decreased based on a historical pattern over a period of time of suggesting a most frequently bought item that is subsequently purchased by the user prior to leaving the retail store 1224. For example, the control circuit 102 may increase the threshold proximity 1222 based on a historical pattern over a period of time of a failure to cause the user to purchase the most frequently bought item prior to leaving the retail store 1224 after a suggestion by the control circuit 102. In some embodiments, the threshold proximity 1222 to the location of the collected item 1202 in the retail store 1224 may include one of: within the same aisle of the location of the collected item 1202, within half an aisle of the location of the collected item 1202, on the same product storage fixture of the location of the collected item 1202, on an adjacent product storage fixture as the product storage fixture of the location of the collected item 1202, within a 5 meter radius of the location of the collected item 1202, within a 3 meter radius of the location of the collected item 1202, and/or within a one meter radius of the location of the collected item 1202.

In some embodiments, the control circuit 102 determines a most frequently bought item of the identified one or more items previously purchased by the user, at step 906, 1006. In an illustrative non-limiting example, in FIG. 12, the control circuit 102 has identified a first item 1204, a second item 1210, and a third item 1216 as items that were previously purchased by the user and within a threshold proximity 1222 to the location of the collected item 1202 in the retail store 1224. In some embodiments, based on the historical purchased data stored in the database 110, the first item 1204 and the second item 1210 are the most frequently bought items as indicated by a first ranking value 1206 and a second ranking value 1212 being equal to one (1), respectively. In some embodiments, the most frequently bought items may include a range of items that are the top two, three, four, five, etc. For example, the most frequently bought items may include the top two most frequently bought previously purchased items, such as the first item 1204 and the second item 1210, having the first and second ranking values 1206, 1212 being equal to one (1), and the third item 1216, having a third ranking value 1218 being equal to two (2). In some embodiments, the control circuit 102 may cause the portable electronic device 104 to display a suggestion for the user to collect the most frequently bought item and add the most frequently bought item to the electronic shopping list of items to purchase. For example, the display screen 108 of the portable electronic device 104 may display a textual and/or visual message displaying a suggestion for the user to collect the most frequently bought item (e.g., the first item 1204, the second item 1210, and the third item 1216) and add the most frequently bought item to the electronic shopping list of items to purchase. As such, in some embodiments, the control circuit 102 determines which item to suggest to the user based on the item being the top/highest most frequently bought item, as illustrated by the first item 1204 and the second item 1210 having the ranking value 1206, 1212 of one (1), as shown in FIG. 12. In such an embodiment, the top/highest most frequently bought item may include one or more items with the same highest ranking value.

In some embodiments, the control circuit 102 may determine that the most frequently bought item results in determining a number of items (i.e., resulting in more than one item) that are most frequently bought, at step 908. By one approach, in an event that the determination of the most frequently bought item results in determining a number of items (i.e., resulting in more than one item) that are most frequently bought, the control circuit 102 may determine a highest weighted one of the number of items that are most frequently bought relative to weighting values associated with the remaining number of items, at step 910. In an illustrative non-limiting example, in FIG. 12, the control circuit 102 may access the database 110 and determine that the first item 1204 is associated with a first weighting value 1208 that may correspond to a value of three (3), the second item 1210 is associated with a second weighting value 1214 that may correspond to a value of two (2), and the third item 1216 is associated with a third weighting value 1220 that may correspond to a value of one (1). In response, the control circuit 102 may determine that the third item 1216 is the highest weighted one of the number of items that are most frequently bought relative to weighting values associated with the remaining number of items. In some embodiments, the control circuit 102 may cause the portable electronic device 104 to display a second suggestion for the user to collect the highest weighted one of the number of items and add the highest weighted one of the number of items to the electronic shopping list of items to purchase, at step 912. For example, the portable electronic device 104 may display a suggestion to the user to collect the third item 1216. Alternatively or in addition to, the suggestion may also include adding the third item 1216 to the electronic shopping list of items to purchase. As such, in some embodiments, the control circuit 102 determines which item to suggest to the user based on the item being one of the most frequently bought items and the item being the highest weighted one among those most frequently bought items, as illustrated by the third item 1216 with the ranking value 1218 of two (2) and the weighting value 1220 of one (1) in FIG. 12. In such an embodiment, the control circuit 102 may cause the portable electronic device 104 to display a second suggestion for the user to collect the highest weighted one of the number of items and add the highest weighted one of the number of items to the electronic shopping list of items to purchase.

In yet some embodiments, in response to the control circuit 102 identifying multiple items that were previously purchased by the user that are located within the threshold proximity 1222 to the location of the collected item 1202 in the retail store 1224, the control circuit 102 may determine an item of the multiple items previously purchased by the user that has a highest weighting value relative to weighting values associated with the multiple items that were previously purchased, at step 1008. In an illustrative non-limiting example, in FIG. 12, the item having the highest weighting value relative to weighting values associated with the multiple items that were previously purchased 1204, 1210, 1216 is the third item 1216 having the weighting value 1220 of one (1). In such an example, the control circuit 102 may cause the portable electronic device 104 to display a suggestion for the user to collect the highest weighted item and add the highest weighted item to the electronic shopping list of items to purchase, at step 1010. For example, the display screen 108 may display a suggestion for the user to collect the third item 1216 and/or add the third item 1216 to the electronic shopping list of items to purchase.

In some embodiments, each weighting value may be based on item attributes, item-user interaction attributes, and/or user attributes. By one approach, the item-user interaction attributes may include a number of times the user has purchased an item, touched and/or picked up an item while shopping, and/or searched the most frequently bought item prior to purchasing, to name a few. In some embodiments, the item attributes and/or product attributes may include type of product an item is associated (e.g., cleaning supplies, produce, canned goods, frozen vegetables, meats, baked goods, desserts, frozen meal, to name a few, location of an item in the retail store (e.g., aisle, shelf, close to an entrance, close to an exit, etc.), price of an item, discounted item, clearance item, ingredients associated with an item, dimensions of an item, among other characteristics attributable to an item. In such an embodiment, each item for purchase at the retail store has a corresponding weighting value that is based on one or more of the item attributes and/or product attributes. In some embodiments, the control circuit 102 may modify the corresponding weighting value of each item for purchase at the retail store for each user/customer based on the user/customer's particular user attributes and/or the user/customer's prior purchase history. For example, the control circuit 102 may modify the corresponding weighting value of each item for purchase at the retail store for each user/customer after every visit of the user/customer at the retail store. In some embodiments, the user attributes may include frequency the user visits and/or shops at the retail store, time of visits at the retail store, age group, gender, length of membership with the retail store, among other characteristics attributable to the user. In some embodiments, in an event that a user/customer does not have a prior purchased data associated with the retail store (e.g., the user/customer has not previously shopped at the retail store and/or at a particular location of the retail store), the control circuit 102 may execute and/or perform the steps of the method 1100 based at least on the item attributes and/or the item-user interaction attributes. In such an embodiment, the item-user interaction attributes may be based on the item-user interaction attributes derived from historical data of a plurality of users/customers of the retail store. In yet some embodiments, in an event that a user/customer does have a prior purchased data associated with the retail store, the control circuit 102 may execute and/or perform the steps of the method 900 and/or the method 1000 based at least on the item attributes, the user attributes and/or the item-user interaction attributes. In such an embodiment, the user attributes are based on the user attributes of a particular user associated with the portable electronic device 104.

In yet some embodiments, the control circuit 102 may, at steps 914 and 1012, determine that none of the items that were previously purchased is within the threshold proximity 1222 to the location of the collected item 1202 in the retail store 1224. In such an embodiment, the control circuit 102 may go through the method 1100 starting at step 1104 to determine an item to suggest and/or recommend to the user. In yet another embodiments, the control circuit 102 may determine that a user does not have a prior purchased history with the retail store and/or with the retail store at a particular location, at step 1102. In such an embodiment, the control circuit 102 may go through the method 1100 starting at step 1102 to determine an item to suggest and/or recommend to the user.

In some embodiments, in response to a determination that a user has not previously purchased any item at the retail store, the control circuit 102 may identify an item to recommend and/or suggest based on the item being associated with at least one of a plurality of prioritized-product types, the item being associated with a highest weighting value relative to weighting values of other items associated with the same prioritized-product type, and the item being located within the threshold proximity 1222 to the location of the collected item 1202. In some embodiments, a plurality of prioritized-product types may include a holiday sales item, an instant savings item, a private brand item, a top seller item, and/or a seasonal item, to name a few. In some embodiments, each of the plurality of prioritized-product types may be ranked relative to one another.

In an illustrative non-limiting example, in FIG. 11, the control circuit 102 may, at step 1104, determine whether a holiday sales item is located within the threshold proximity 1222 to the location of the collected item 1202 and/or that the holiday sales item is associated with a highest weighting value relative to weighting values of other holiday sales items located within the threshold proximity 1222 to the location of the collected item 1202. By one approach, a determination that there is a holiday sales item within the threshold proximity 1222 to the location of the collected item 1202 and/or that the holiday sales item is associated with the highest weighting value, the control circuit 102 may cause the portable electronic device 104 to display a suggestion for the user to collect the holiday sales item and/or add the holiday sales item to the electronic shopping list of items to purchase, at step 1124. By one approach, holiday sales item may include holiday decorations, holiday themed items, holiday food items, and/or other items (e.g., produce, food items, non-food items, etc.) that are generally bought and/or sold during a particular holiday.

In some embodiments, the control circuit 102 may, at step 1106, determine whether an instant savings item is located within the threshold proximity 1222 to the location of the collected item 1202 and/or that the instant savings item is associated with a highest weighting value relative to weighting values of other instant savings items located within the threshold proximity 1222 to the location of the collected item 1202. By one approach, a determination that there is an instant savings item within the threshold proximity 1222 to the location of the collected item 1202 and/or that the instant savings item is associated with the highest weighting value, the control circuit 102 may cause the portable electronic device 104 to display a suggestion for the user to collect the instant savings item and/or add the instant savings item to the electronic shopping list of items to purchase, at step 1116. By one approach, an instant savings item may include discounted items, promotional items, clearance items, and/or any other items that are sold for less than the retail price.

In some embodiments, the control circuit 102 may, at step 1108, determine whether a private brand item for upsell is located within the threshold proximity 1222 to the location of the collected item 1202 and/or that the private brand item for upsell is associated with a highest weighting value relative to weighting values of other private brand items for upsell located within the threshold proximity 1222 to the location of the collected item 1202. By one approach, a determination that there is a private brand item for upsell within the threshold proximity 1222 to the location of the collected item 1202 and/or that the private brand item for upsell is associated with the highest weighting value, the control circuit 102 may cause the portable electronic device 104 to display a suggestion for the user to collect the private brand item for upsell and/or add the private brand item for upsell to the electronic shopping list of items to purchase, at step 1118. By one approach, a private brand item may include non-brand items, store brand items, and/or other items that are sold under a generic and/or non-brand product labels.

In some embodiments, the control circuit 102 may, at step 1110, determine whether a top seller item is located within the threshold proximity 1222 to the location of the collected item 1202 and/or that the top seller item is associated with a highest weighting value relative to weighting values of other top seller items located within the threshold proximity 1222 to the location of the collected item 1202. By one approach, a determination that there is a top seller item within the threshold proximity 1222 to the location of the collected item 1202 and/or that the top seller item is associated with the highest weighting value, the control circuit 102 may cause the portable electronic device 104 to display a suggestion for the user to collect the top seller item and/or add the top seller item to the electronic shopping list of items to purchase, at step 1120. By one approach, a top seller item may include an item that is a number one seller in the retail store for a historical period of a month, a week, and/or a day.

In some embodiments, the control circuit 102 may, at step 1112, determine whether a seasonal item is located within the threshold proximity 1222 to the location of the collected item 1202 and/or that the seasonal item is associated with a highest weighting value relative to weighting values of other seasonal items located within the threshold proximity 1222 to the location of the collected item 1202. By one approach, a determination that there is a seasonal item within the threshold proximity 1222 to the location of the collected item 1202 and/or that the seasonal item is associated with the highest weighting value, the control circuit 102 may cause the portable electronic device 104 to display a suggestion for the user to collect the seasonal item and/or add the seasonal item to the electronic shopping list of items to purchase, at step 1122. By one approach, a seasonal item may include an item that is generally associated with one or more of the four seasons (e.g., spring, summer, fall, and winter). In yet some embodiments, the control circuit 102 may dynamically change the priority and/or the ranking associated with each of the plurality of prioritized-product types relative to each other based on historical success of getting the general users to buy the suggested and/or recommended item, level of inventories available at the retail store, a calendar month, a season, a celebrated holiday, sales data, and/or vendor request. For example, the control circuit 102 may prioritized the instant savings item when the control circuit 102 determines that there is a high level of inventory associated with the instant savings item. In another example, the control circuit 102 may prioritized the seasonal item when the control circuit 102 determines that a particular season that the seasonal item is associated with has ended. As such, the order the control circuit 102 may evaluate each of the plurality of prioritized-product types to determine an item to suggest and/or recommend to a user may be based on one or more of the historical success of getting the general users to buy the suggested and/or recommended item, the level of inventories available at the retail store, a calendar month, a season, a celebrated holiday, sales data, and/or vendor request.

In yet some embodiments, in an event where the control circuit 102 has not identified an item to suggest and/or recommend after evaluating each of the plurality of prioritized-product types, the control circuit 102 may, at step 1114, not suggest and/or recommend an item at all until the portable electronic device 104 obtains a subsequent identifying data corresponding to a subsequent item collected by the user while the user is shopping at the retail store.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for automatically recommending an item to a customer while the customer is shopping at a retail store, the system comprising:
   a plurality of items available for purchase at the retail store;
   an application associated with the retail store and operable with a portable electronic device associated with a user that is shopping at the retail store, the portable electronic device in cooperation with the application configured to obtain identifying data corresponding to a first item collected by the user for purchase while the user is shopping at the retail store and add the first item to an electronic shopping list of items to purchase via the application; and
   a control circuit communicatively coupled to the application via a network, the control circuit configured to:
      receive data associated with the first item in response to obtaining the identifying data corresponding to the first item by the portable electronic device;
      determine a location in the retail store of the first item based on the received data;
      identify one or more items previously purchased by the user that are located within a threshold proximity to the location of the first item collected by the user in the retail store based on a stored user profile comprising items that are grouped in accordance with predetermined thresholds of probability of likelihood of being selected by the user;
      determine, using a trained machine learning model, a most frequently bought item of the identified one or more items previously purchased by the user that are located within the threshold proximity to the location of the first item collected by the user based on the stored user profile;
      trigger display on the portable electronic device of a suggestion for the user to collect the most frequently bought item and to add the most frequently bought item to the electronic shopping list of items to purchase; and
      update the stored user profile when the user selects and purchases the most frequently bought item, wherein the trained machine learning model bases a subsequent determination of the most frequently bought item on the updated stored user profile,
      wherein the threshold proximity to the location of the first item in the retail store comprises one of: within the same aisle of the location of the first item, within half an aisle of the location of the first item, on the same product storage fixture of the location of the first item, on an adjacent product storage fixture as the product storage fixture of the location of the first item, within a 5 meter radius of the location of the first item, within a 3 meter radius of the location of the first item, and within a one meter radius of the location of the first item.

2. The system of claim 1, wherein, in an event that the determination of the most frequently bought item results in determining a number of items that are most frequently bought, the control circuit is further configured to:
determine, using the trained machine learning model, a highest weighted one of the number of items that are most frequently bought relative to weighting values associated with remaining number of items, wherein each of the weighting values is based on corresponding item attributes, item-user interaction attributes, and user attributes; and
trigger display on the portable electronic device of a second suggestion for the user to collect the highest weighted one of the number of items and add the highest weighted one of the number of items to the electronic shopping list of items to purchase.

3. The system of claim 2, wherein the item-user interaction attributes comprise a number of times the user purchased, touched, and searched the most frequently bought item.

4. The system of claim 1, wherein the control circuit is further configured to increase the threshold proximity based on a historical pattern over a period of time of a failure to cause the user to purchase the most frequently bought item prior to leaving the retail store after the suggestion.

5. The system of claim 1, wherein the control circuit is further configured to, in response to a determination that the user has not previously purchased any one item of the plurality of items at the retail store, identify a second item of the plurality of items based on the second item being associated with at least one of a plurality of prioritized-product types, the second item being associated with a highest weighting value relative to weighting values of other items associated with the same prioritized-product type associated with the second item, and the second item being located within the threshold proximity to the location of the first item.

6. The system of claim 5, wherein the plurality of prioritized-product types comprises a holiday sales item, an instant saving item, a private brand item, a top seller item, and a seasonal item.

7. The system of claim 6, wherein each of the plurality of prioritized-product types is ranked relative to one another.

8. The system of claim 1, wherein the trained machine learning model is trained to determine an item previously purchased by the user that is within a threshold of probability of likelihood of being selected by the user when presented to the user based on the stored user profile.

9. The system of claim 1, wherein the control circuit is further configured to process item data associated with the plurality of items available for purchase at the retail store to determine one or more features input in training the trained machine learning model.

10. The system of claim 1, wherein the control circuit is further configured to continuously train the trained machine learning model to determine items that are within a threshold of probability of likelihood of being selected by users when presented to the users based on the stored user profile.

11. A system for automatically recommending an item to a customer while the customer is shopping at a retail store, the system comprising:
a plurality of items available for purchase at the retail store;
an application associated with the retail store and operable with a portable electronic device associated with a user that is shopping at the retail store, the portable electronic device in cooperation with the application configured to obtain identifying data corresponding to a first item collected by the user for purchase while the user is shopping at the retail store and add the first item to an electronic shopping list of items to purchase via the application; and
a control circuit communicatively coupled to the application via a network, the control circuit configured to:
receive data associated with the first item in response to obtaining the identifying data corresponding to the first item by the portable electronic device;
determine a location in the retail store of the first item based on the received data;
identify one or more items previously purchased by the user that are located within a threshold proximity to the location of the first item collected by the user in the retail store based on a stored user profile comprising items that are grouped in accordance with predetermined thresholds of probability of likelihood of being selected by the user;
determine, using a trained machine learning model, a most frequently bought item of the identified one or more items previously purchased by the user that are located within the threshold proximity to the location of the first item collected by the user based on the stored user profile;
trigger display on the portable electronic device of a suggestion for the user to collect the most frequently bought item and to add the most frequently bought item to the electronic shopping list of items to purchase; and
update the stored user profile when the user selects and purchases the most frequently bought item, wherein the trained machine learning model bases a subsequent determination of the most frequently bought item on the updated stored user profile,
wherein the threshold proximity is based on a historical pattern over a period of time of suggesting the most frequently bought item that is subsequently purchased by the user prior to leaving the retail store.

12. A system for automatically recommending an item to a customer while the customer is shopping at a retail store, the system comprising:
a plurality of items available for purchase at the retail store;
an application associated with the retail store and operable with a portable electronic device associated with a user that is shopping at the retail store, the portable electronic device in cooperation with the application configured to obtain identifying data corresponding to a first item collected by the user for purchase while the user is shopping at the retail store and add the first item to an electronic shopping list of items to purchase via the application; and
a control circuit communicatively coupled to the application via a network, the control circuit configured to:
receive data associated with the first item in response to obtaining the identifying data corresponding to the first item by the portable electronic device;
determine a location in the retail store of the first item based on the received data;
identify one or more items previously purchased by the user that are located within a threshold proximity to the location of the first item collected by the user in the retail store based on a stored user profile comprising items that are grouped in accordance with predetermined thresholds of probability of likelihood of being selected by the user;

determine, using a trained machine learning model, a most frequently bought item of the identified one or more items previously purchased by the user that are located within the threshold proximity to the location of the first item collected by the user based on the stored user profile;

trigger display on the portable electronic device of a suggestion for the user to collect the most frequently bought item and to add the most frequently bought item to the electronic shopping list of items to purchase; and update the stored user profile when the user selects and purchases the most frequently bought item, wherein the trained machine learning model bases a subsequent determination of the most frequently bought item on the updated stored user profile, wherein the portable electronic device is further configured to provide initiation signal to the control circuit when the user enters the retail store to enable the control circuit to determine whether the user has previously purchased items at the retail store, wherein the initiation signal comprises one or more user attributes and location data of the portable electronic device, wherein the control circuit is further configured to, in response to a receipt of the initiation signal, provide a store identifier associated with the retail store to the portable electronic device, and wherein the store identifier is stored by the portable electronic device.

13. The system of claim 12, wherein the data received by the control circuit in response to obtaining the identifying data corresponding to the first item by the portable electronic device comprises an item identifier associated with the first item and the store identifier associated with the retail store.

14. A method for automatically recommending an item to a customer while the customer is shopping at a retail store, the method comprising:

obtaining, by an application operable with a portable electronic device associated with a user via a network, identifying data corresponding to a first item collected by the user for purchase while the user is shopping at the retail store and add the first item to an electronic shopping list of items to purchase via the application;

receiving, by a control circuit communicatively coupled to the application associated with the retail store, data associated with the first item in response to obtaining the identifying data corresponding to the first item by the portable electronic device;

determining, by the control circuit, a location in the retail store of the first item based on the received data;

identifying, by the control circuit, one or more items previously purchased by the user that are located within a threshold proximity to the location of the first item collected by the user in the retail store based on a stored user profile comprising items that are grouped in accordance with predetermined thresholds of probability of likelihood of being selected by the user;

determining, by the control circuit using a trained machine learning model, a most frequently bought item of the identified one or more items previously purchased by the user that are located within the threshold proximity to the location of the first item collected by the user based on the stored user profile;

triggering, by the control circuit, display on the portable electronic device of a suggestion for the user to collect the most frequently bought item and to add the most frequently bought item to the electronic shopping list of items to purchase; and update the stored user profile when the user selects and purchases the most frequently bought item, wherein the trained machine learning model bases a subsequent determination of the most frequently bought item on the updated stored user profile, wherein the threshold proximity to the location of the first item in the retail store comprises one of: within the same aisle of the location of the first item, within half an aisle of the location of the first item, on the same product storage fixture of the location of the first item, on an adjacent product storage fixture as the product storage fixture of the location of the first item, within a 5 meter radius of the location of the first item, within a 3 meter radius of the location of the first item, and within a one meter radius of the location of the first item.

15. The method of claim 14, wherein, in an event that the determination of the most frequently bought item results in determining a number of items that are most frequently bought, the method further comprises:

determining, by the control circuit, using the trained machine learning model, a highest weighted one of the number of items that are most frequently bought relative to weighting values associated with remaining number of items, wherein each of the weighting values is based on corresponding item attributes, item-user interaction attributes, and user attributes; and causing, by the control circuit, the portable electronic device to display a second suggestion for the user to collect the highest weighted one of the number of items and add the highest weighted one of the number of items to the electronic shopping list of items to purchase.

16. The method of claim 15, wherein the item-user interaction attributes comprise a number of times the user purchased, touched, and searched the most frequently bought item.

17. The method of claim 14, wherein the threshold proximity is based on a subsequently purchased by the user prior to leaving the retail store.

18. The method of claim 14, further comprising increasing, by the control circuit, the threshold proximity based on a historical pattern over a period of time of a failure to cause the user to purchase the most frequently bought item prior to leaving the retail store after the suggestion.

19. The method of claim 14, further comprising, in response to a determination that the user has not previously purchased any one item of a plurality of items at the retail store, identifying, by the control circuit, a second item of the plurality of items based on the second item being associated with at least one of a plurality of prioritized-product types, the second item being associated with a highest weighting value relative to weighting values of other items associated with the same prioritized-product type associated with the second item, and the second item being located within the threshold proximity to the location of the first item.

20. The method of claim 19, wherein the plurality of prioritized-product types comprises a holiday sales item, an instant saving item, a private brand item, a top seller item, and a seasonal item.

21. The method of claim 20, wherein each of the plurality of prioritized-product types is ranked relative to one another.

22. The method of claim 14, further comprising:
providing, by the portable electronic device, initiation signal to the control circuit when the user enters the retail store to enable the control circuit to determine whether the user has previously purchased the one or more items at the retail store, wherein the initiation signal comprises one or more user attributes and location data of the portable electronic device; and
in response to a receipt of the initiation signal, providing, by the control circuit, a store identifier associated with the retail store to the portable electronic device, wherein the store identifier is stored by the portable electronic device.

23. The method of claim 22, wherein the data received by the control circuit in response to obtaining the identifying data corresponding to the first item by the portable electronic device comprises an item identifier associated with the first item and the store identifier associated with the retail store.

24. A system for automatically recommending an item to a customer while the customer is shopping at a retail store, the system comprising:
a plurality of items available for purchase at the retail store;
an application associated with the retail store and operable with a portable electronic device associated with a user that is shopping at the retail store, the portable electronic device in cooperation with the application configured to obtain identifying data corresponding to a first item collected by the user for purchase while the user is shopping at the retail store and add the first item to an electronic shopping list of items to purchase via the application; and
a control circuit communicatively coupled to the application via a network, the control circuit configured to:
receive data associated with the first item in response to obtaining the identifying data corresponding to the first item by the portable electronic device;
determine a location in the retail store of the first item based on the received data;
identify one or more items previously purchased by the user that are located within a threshold proximity to the location of the first item collected by the user in the retail store based on a stored user profile comprising items that are grouped in accordance with predetermined thresholds of probability of likelihood of being selected by the user;
determine, using a trained machine learning model, an item of the one or more items previously purchased by the user having a highest weighting value relative to weighting values associated with the identified one or more items previously purchased that are located within the threshold proximity to the location of the first item collected by the user based on the stored user profile, wherein each of the weighting values is based on corresponding item attributes, item-user interaction attributes, and user attributes;
trigger display on the portable electronic device of a suggestion for the user to collect the highest weighted item and to add the highest weighted item to the electronic shopping list of items to purchase; and
update the stored user profile when the user selects and purchases the highest weighted item, wherein the trained machine learning model bases a subsequent determination of the highest weighted item on the updated stored user profile.

25. The system of claim 24, wherein the item-user interaction attributes comprise a number of times the user purchased, touched, and searched the most frequently bought item.

26. The system of claim 24, wherein the control circuit is further configured to, in response to a determination that the user has not previously purchased any one item of the plurality of items at the retail store, identify a second item of the plurality of items based on the second item being associated with at least one of a plurality of prioritized-product types, the second item being associated with a highest weighting value relative to weighting values of other items associated with the same prioritized-product type associated with the second item, and the second item being located within the threshold proximity to the location of the first item.

* * * * *